United States Patent
Ponto et al.

(10) Patent No.: US 11,257,199 B2
(45) Date of Patent: Feb. 22, 2022

(54) SYSTEMS, METHODS, AND MEDIA FOR DETECTING MANIPULATIONS OF POINT CLOUD DATA

(71) Applicant: Wisconsin Alumni Research Foundation, Madison, WI (US)

(72) Inventors: Kevin Ponto, Madison, WI (US); Ross D. Tredinnick, Madison, WI (US); Simon P. B. Smith, Stoughton, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 0 days.

(21) Appl. No.: 16/657,197

(22) Filed: Oct. 18, 2019

(65) Prior Publication Data

US 2020/0126208 A1 Apr. 23, 2020

Related U.S. Application Data

(60) Provisional application No. 62/747,476, filed on Oct. 18, 2018.

(51) Int. Cl.
*G06T 7/00* (2017.01)
*G06T 11/00* (2006.01)
*G06T 11/20* (2006.01)

(52) U.S. Cl.
CPC .......... *G06T 7/0002* (2013.01); *G06T 11/001* (2013.01); *G06T 11/203* (2013.01); *G06T 2207/10028* (2013.01)

(58) Field of Classification Search
CPC ... G06T 7/0002; G06T 11/001; G06T 11/203; G06T 2207/10028; G06T 2219/2012; G06T 19/20; G06T 2210/56
See application file for complete search history.

(56) References Cited

U.S. PATENT DOCUMENTS

| 7,317,456 B1* | 1/2008 | Lee | G06T 15/08 345/427 |
| 2009/0105947 A1* | 4/2009 | Nachesa | G01C 21/3679 701/533 |

(Continued)

OTHER PUBLICATIONS

Barazzetti L, et al. 3d scanning and imaging for quick documentation of crime and accident scenes. In: Sensors, and Command, Control, Communications, and Intelligence (C3I) Technologies for Homeland Security and Homeland Defense XI. International Society for Optics and Photonics; vol. 8359; 2012. p. 835910.

(Continued)

*Primary Examiner* — Grace Q Li
(74) *Attorney, Agent, or Firm* — Quarles & Brady LLP

(57) ABSTRACT

In accordance with some aspects, systems, methods and media for detecting manipulations of point cloud data are provided. In some aspects, a method for presenting information indicative of whether a manipulation of point cloud data has occurred is provided, the method comprising: receiving point cloud data comprising a plurality of points, wherein each point of the plurality of points is associated with a position; determining, for each of the plurality of points, a value indicative of a density of points in a region surrounding the respective point; associating, for each of the plurality of points, the value indicative of density with the respective point; and causing a representation of at least a portion of the point cloud data to be presented based on the location information associated with each point of the plurality of points, and the value indicative of density associated with each of the plurality of points.

21 Claims, 23 Drawing Sheets
(14 of 23 Drawing Sheet(s) Filed in Color)

Point Cloud of a Section of Floor Including Manipulations and Representation Based on Density of Points by Location in Scene

(56) References Cited

U.S. PATENT DOCUMENTS

| | | | | |
|---|---|---|---|---|
| 2012/0128218 | A1* | 5/2012 | Amyot | G06T 19/00 |
| | | | | 382/128 |
| 2015/0120037 | A1* | 4/2015 | Chang | G05B 19/404 |
| | | | | 700/187 |
| 2016/0242852 | A1* | 8/2016 | Yosibash | G16H 50/50 |
| 2017/0312032 | A1* | 11/2017 | Amanatullah | G09B 23/30 |
| 2019/0355144 | A1* | 11/2019 | Korobov | G06T 7/70 |
| 2020/0043186 | A1* | 2/2020 | Selviah | G06K 9/6203 |

OTHER PUBLICATIONS

Blaszczak-Bak W, et al. Modification of li-dar point cloud processing methodology. In: FIG Congress. Facing the Challenges—Building the Capacity Sydney, Australia, vol. 11; 2010. p. 16.

Buck U, et al. Accident or homicide—virtual crime scene reconstruction using 3d methods. Forensic science inter-national 2013;225(1-3):75-84.

Dehaan JD. 3d laser scanning. Emerging and Advanced Technologies in Diverse Forensic Sciences 2018; 132-148.

Demir I, et al. Procedural editing of 3d building point clouds. In: Proceedings of the IEEE International Conference on Computer Vision. 2015. p. 2147-55.

Farid H. Digital image forensics. Scientific American 2008;298(6):66-71.

Farid H. How to detect faked photos. American Scientist 2017;3.

Farid H. Photo fakery and forensics. Advances in Computers 2009;77:1-55.

Forensic Technology Center of Excellence . Technical evaluation of three panoramic crime scene imaging technologies. Available online https://rti. connectsolutions.com/p32zmkjgm0n/; 2013.

Kee E, et al. Exposing photo manipulation with inconsistent shadows. ACM Transactions on Graphics (ToG) 2013;32(3):28.

Krawetz N. Digital photo forensics. Handbook of Digital Imaging 2015;:1-34.

Luo H, et al. A reversible data hiding scheme for 3d point cloud model. In: 2006 IEEE International Symposium on Signal Processing and Information Technology. IEEE; 2006. p. 863-7.

Meagher D. Geometric modeling using octree encoding. Computer graphics and image processing 1982;19(2):129-47.

Ohbuchi R, et al. Watermarking a 3d shape model de-fined as a point set. In: 2004 International Conference on Cyberworlds. IEEE; 2004. p. 392-9.

Olsen M, et al. 2d open-source editing techniques for 3d laser scans. Proc, Computer Applications and Quantitative Methods in Archaeology, CAA 2010;:47-50.

Scheiblauer C, et al. Out-of-core selection and editing of huge point clouds. Computers & Graphics 2011;35(2):342-51.

Wand M, et al. Interactive editing of large point clouds. In: SPBG. 2007. p. 37-45.

Wand M, et al. Processing and interactive editing of huge point clouds from 3d scanners. Computers & Graphics 2008;32(2):204-20.

\* cited by examiner

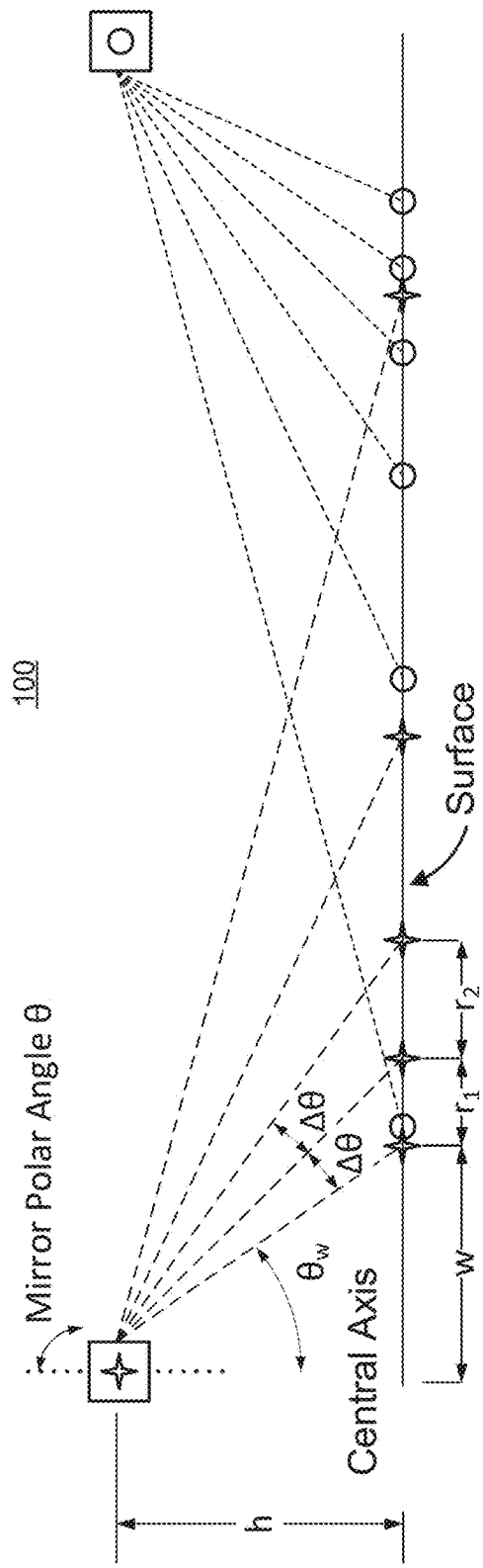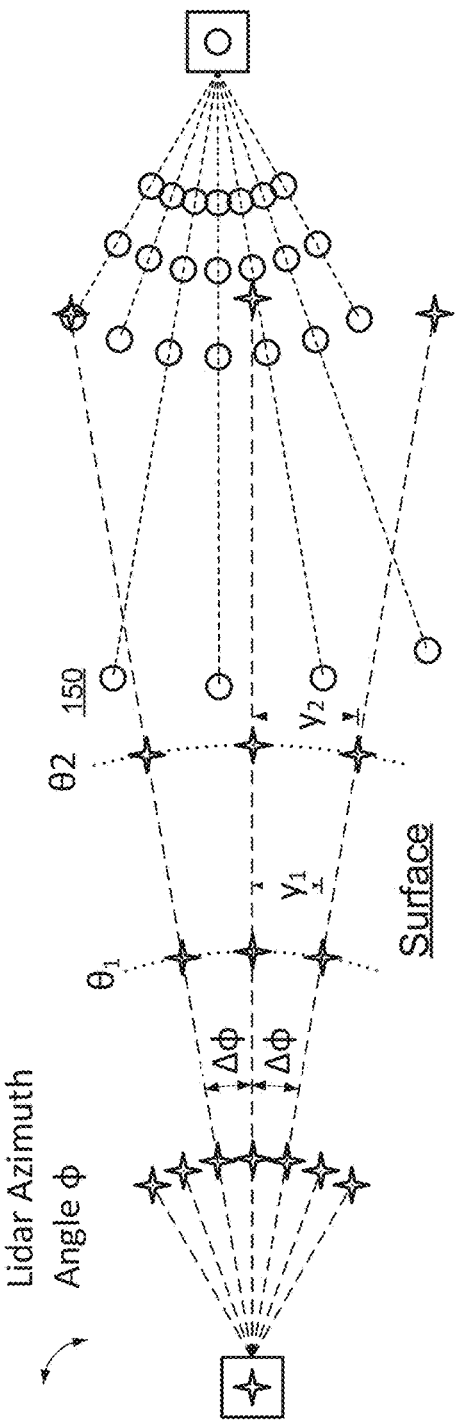

300

| Index | XYZRGB |
|---|---|
| 1 | $XYZRGB_1$ |
| 2 | $XYZRGB_2$ |
| 3 | $XYZRGB_3$ |
| ⋮ | ⋮ |
| n-1 | $XYZRGB_{(n-1)}$ |
| n | $XYZRGB_n$ |
| n+1 | $XYZRGB_{(n+1)}$ |
| ⋮ | ⋮ |
| N | $XYZRGB_N$ |

| Index | XYZRGB | |
|---|---|---|
| 1 | $XYZRGB_1$ | ⎫ |
| 2 | $XYZRGB_2$ | |
| 3 | $XYZRGB_3$ | Scan 1 |
| ⋮ | ⋮ | |
| n-1 | $XYZRGB_{(n-1)}$ | ⎭ |
| n | $XYZRGB_n$ | ⎫ |
| n+1 | $XYZRGB_{(n+1)}$ | |
| ⋮ | ⋮ | Scan X |
| N | $XYZRGB_N$ | ⎭ |

| Index | XYZRGB | |
|---|---|---|
| 1 | $XYZRGB_1$ | ⎫ Root |
| ⋮ | ⋮ | |
| m | $XYZRGB_m$ | ⎭ |
| m+1 | $XYZRGB_{m+1}$ | ⎫ |
| ⋮ | ⋮ | Octant 1 |
| n-1 | $XYZRGB_{(n-1)}$ | ⎭ |
| n | $XYZRGB_n$ | |
| ⋮ | ⋮ | |
| k | $XYZRGB_k$ | ⎫ |
| ⋮ | ⋮ | Octant 8 |
| N | $XYZRGB_N$ | ⎭ |

FIG. 3C

FIG. 6 Composite of Multiple Lidar Scans in One File

Composite of Multiple Lidar Scans in One File Subsampled using Various Techniques Composite of Multiple Lidar Scans Reorganized based on Octant Composite of Multiple Lidar Scans Reorganized based on Octant with Higher Resolution Representation of Statue Inserted at End of File Representation of Point Cloud Based on
Distance Between Adjacent Points in File,
with Color based on Euclidean Distance Point Cloud of Scene with Manipulations and
Representation Based on
Density of Points by Location in Scene Point Cloud of a Section of Floor Including Manipulations and Representation Based on Density of Points by Location in Scene Representation of a Portion of a Point Cloud Using Vectors with Direction Based on Density Gradients of Points in File, with Color based on Magnitude of the Vector Point Clouds of a Scene Combined with and without Duplicate Point Removal and Representations Based on Density of Points by Location in Scene Down-sampled Point Cloud Before and After a Manipulation to add a Chair to the Scene with Density Gradient and Spherical Sampling Visualized Point Clouds of a Scene Before and After a Manipulation to Add a "Body" to the Scene and Representations Based on Density of Points by Location in Scene Point Clouds of a Scene Before and After a Manipulation to Add Drawers and Representations Based on Density of Points by Location in Scene Point Clouds of a Scene Before and After a Manipulation to Add Artwork to the Wall to Cover a Piece of Paper and Representations Based on Density of Points by Location in Scene

SYSTEMS, METHODS, AND MEDIA FOR DETECTING MANIPULATIONS OF POINT CLOUD DATA

CROSS-REFERENCE TO RELATED APPLICATIONS

This application claims the benefit, under 35 U.S.C. § 119, of U.S. Application No. 62/747,476, filed Oct. 18, 2018, which is hereby incorporated herein by reference in its entirety for all purposes.

STATEMENT REGARDING FEDERALLY SPONSORED RESEARCH

This invention was made with government support under 2016-IJ-CX-0017 awarded by the US Department of Justice. The government has certain rights in the invention.

BACKGROUND

Point cloud data (e.g., created using lidar techniques, sometimes referred to as LIDAR, LiDAR, or LADAR) can be used to preserve the positions of objects within a scene or scenes in great detail. For example, point cloud data can be used to represent the contents of a room, a building, a crime scene, a landmark, a land formation, etc., in detail such that a replica of the scene can be reproduced. Such point cloud representations may be useful for a variety of applications, such as studying details of a crime scene without blocking off the area for an extended period of time (e.g., days or weeks), for preserving sites of cultural importance (e.g., buildings, landmarks, etc.) that may otherwise be lost due to neglect, erosion, etc.

The use of 3D scanning technology for crime scene investigation (CSI) has grown in recent years. For example, 3D scans have been used to help determine if a crime scene contains an accidental death or a homicide. Such technology has also been used at many high-profile incidents for crime scene documentation and evidence gathering, such as the London underground bombings of 2005. Using 3D scanning technology can provide many advantages, such as that the crime scene cab be preserved and frozen in time, the scanning and data collection process is non-intrusive, and evaluations and measurements can be performed independently of crime scene access. With an increase in available technology options, and reductions in cost since the mid-2000s, many policing units across the world have or will consider adoption of the technology.

While original point cloud data can faithfully preserve the positions of objects within the scene, manipulation of the data that alters how the scene is presented is possible. For example, a point cloud used to capture a crime scene can be manipulated to obscure evidence. In a more particular example, if there is blood on the floor, another portion of floor can be copied and used to replace the portion of floor that has blood on it. Detection of such manipulation can be very difficult to detect while viewing the scene, in part because the scene can feel very immersive to the viewer which can induce the viewer to subconsciously correct some anomalies. Other examples can include removing a collected piece of evidence, planting new pieces of evidence in the scene, or covering up critical details in a scene. In light of the potential for manipulation, techniques that can be used to validate that 3D scans have not been manipulated in certain ways can reassure fact finders (e.g., jurors, judges, etc.) that the evidence being relied has not been maliciously altered.

The generation of a 3D model of a crime scene can often involve the combination of several scans from different locations. In this regard, to ensure validity, a direct comparison cannot be easily made between originally acquired evidence to the version presented in court, whereas such comparisons are much simply for other types of evidence, such as a photograph. A photograph taken from a digital camera can be downloaded and used directly in a court of law. Any manipulations to the file will result in a failure of file comparisons (such as from using an MD5 checksum). By contrast, for point cloud models this cannot be done because the model is generated using multiple files which are combined and modified to generate the result. An analogy to photography can be found in panoramic images created using photo-stitching techniques. The resultant panorama cannot be directly compared to the individual images on a per file basis because the panorama may include only a portion of each individual image, and analysis must instead be performed on a per pixel basis. Further, 3D processing software often adds other manipulations to make data more attractive and/or more accessible. For example, some software performs techniques such as duplicate point removal, which attempts to eliminate problems that can occur when multiple overlapping scans are combined.

Unfortunately, no techniques currently exist to ensure that 3D data has not been manipulated or tampered with prior to display (e.g., in a courtroom). In the same way a 2D image can be altered through image editing software, such as Adobe Photoshop, 3D data can be edited or altered in various ways. As 3D scanning technologies continue to become more prevalent in the criminal justice system, there is a growing need for tools to ensure the validity of 3D data.

Accordingly, systems, methods, and media, for detecting manipulations of point cloud data are desirable.

SUMMARY

In accordance with some embodiments of the disclosed subject matter, systems, methods, and media, for detecting manipulations of point cloud data are provided.

In accordance with some embodiments of the disclosed subject matter, a method for presenting information indicative of whether a manipulation of point cloud data has occurred is provided, the method comprising: receiving point cloud data comprising a plurality of points, wherein each point of the plurality of points is associated with a position; determining, for each of the plurality of points, a value indicative of a density of points in a region surrounding the respective point; associating, for each of the plurality of points, the value indicative of density with the respective point; and causing a representation of at least a portion of the point cloud data to be presented based on the location information associated with each point of the plurality of points, and the value indicative of density associated with each of the plurality of points.

In some embodiments, determining the value indicative of a density of points in a region surrounding the respective point comprises: identifying a closest point in the point cloud data to the respective point; and generating a vector indicative of the distance and direction between the respective point and the closest point in the point cloud data.

In some embodiments, identifying a closest point in the point cloud data to the respective point comprises: (a) drawing a sphere having a predetermined radius around the respective point; (b) determining that the number of points in the point cloud data that fall within the sphere is greater than 1; (c) in response to determining that the number of points in the point cloud data that fall within the sphere is greater than 1, redrawing the sphere with a smaller radius; (d) repeating b) and c) until the number of points within the sphere is equal to 1; and (e) identifying the point remaining within the sphere as the closes point in the point cloud data to the respective point.

In some embodiments, determining a value indicative of a density of points in a region surrounding the respective point comprises: drawing a sphere having a predetermined radius around the respective point; and recording the number of points of the point cloud data that fall within the sphere as the value indicative of density.

In some embodiments, the predetermined radius is one centimeter.

In some embodiments, presenting a representation of at least the portion of the point cloud data based on the location information associated with each point of the plurality of points, and the value indicative of density associated with each of the plurality of points comprises: causing an image comprising a plurality of pixels to be presented, each of the plurality of pixels corresponding to at least one of the plurality of points, wherein each of the plurality of pixels is presented in a false color based on the value indicative of density associated with the respective point of the plurality of points.

In some embodiments, the false color falls on a spectrum from blue to red with less dense points being represented toward the blue end of the spectrum and more dense points being represented toward the red end of the spectrum.

In some embodiments, the false color in which each of the plurality of pixels is presented is based on an average of the value indicative of density associated with points in the point cloud data that coincide with the region of the point cloud data represented by the respective pixel.

In accordance with some embodiments of the disclosed subject matter, a system for presenting information indicative of whether a manipulation of point cloud data has occurred is provided, the system comprising: at least one hardware processor that is programmed to: receive point cloud data comprising a plurality of points, wherein each point of the plurality of points is associated with a position; determine, for each of the plurality of points, a value indicative of a density of points in a region surrounding the respective point; associate, for each of the plurality of points, the value indicative of density with the respective point; and cause a representation of at least a portion of the point cloud data to be presented based on the location information associated with each point of the plurality of points, and the value indicative of density associated with each of the plurality of points.

In accordance with some embodiments of the disclosed subject matter, a non-transitory computer readable medium containing computer executable instructions that, when executed by a processor, cause the processor to perform a method for presenting information indicative of whether a manipulation of point cloud data has occurred is provided, the method comprising: receiving point cloud data comprising a plurality of points, wherein each point of the plurality of points is associated with a position; determining, for each of the plurality of points, a value indicative of a density of points in a region surrounding the respective point; associating, for each of the plurality of points, the value indicative of density with the respective point; and causing a representation of at least a portion of the point cloud data to be presented based on the location information associated with each point of the plurality of points, and the value indicative of density associated with each of the plurality of points.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various objects, features, and advantages of the disclosed subject matter can be more fully appreciated with reference to the following detailed description of the disclosed subject matter when considered in connection with the following drawings, in which like reference numerals identify like elements.

FIG. 1A shows an example of a cross-sectional view of point cloud points being captured by two LiDAR scanners.

FIG. 1B shows an example of a top-down view of point cloud points being captured by two LiDAR scanners.

FIG. 3A shows an example organizational structure of a point cloud file that can be used to render a portion of a point cloud in accordance with some aspects of the disclosed subject matter.

FIG. 3B shows an example organizational structure of a point cloud file sorted by scan that can be used to render a portion of a point cloud in accordance with some aspects of the disclosed subject matter.

FIG. 3C shows an example organizational structure of a point cloud file sorted by physical location within a scene that can be used to render a portion of a point cloud in accordance with some aspects of the disclosed subject matter.

DETAILED DESCRIPTION

Figure 2:
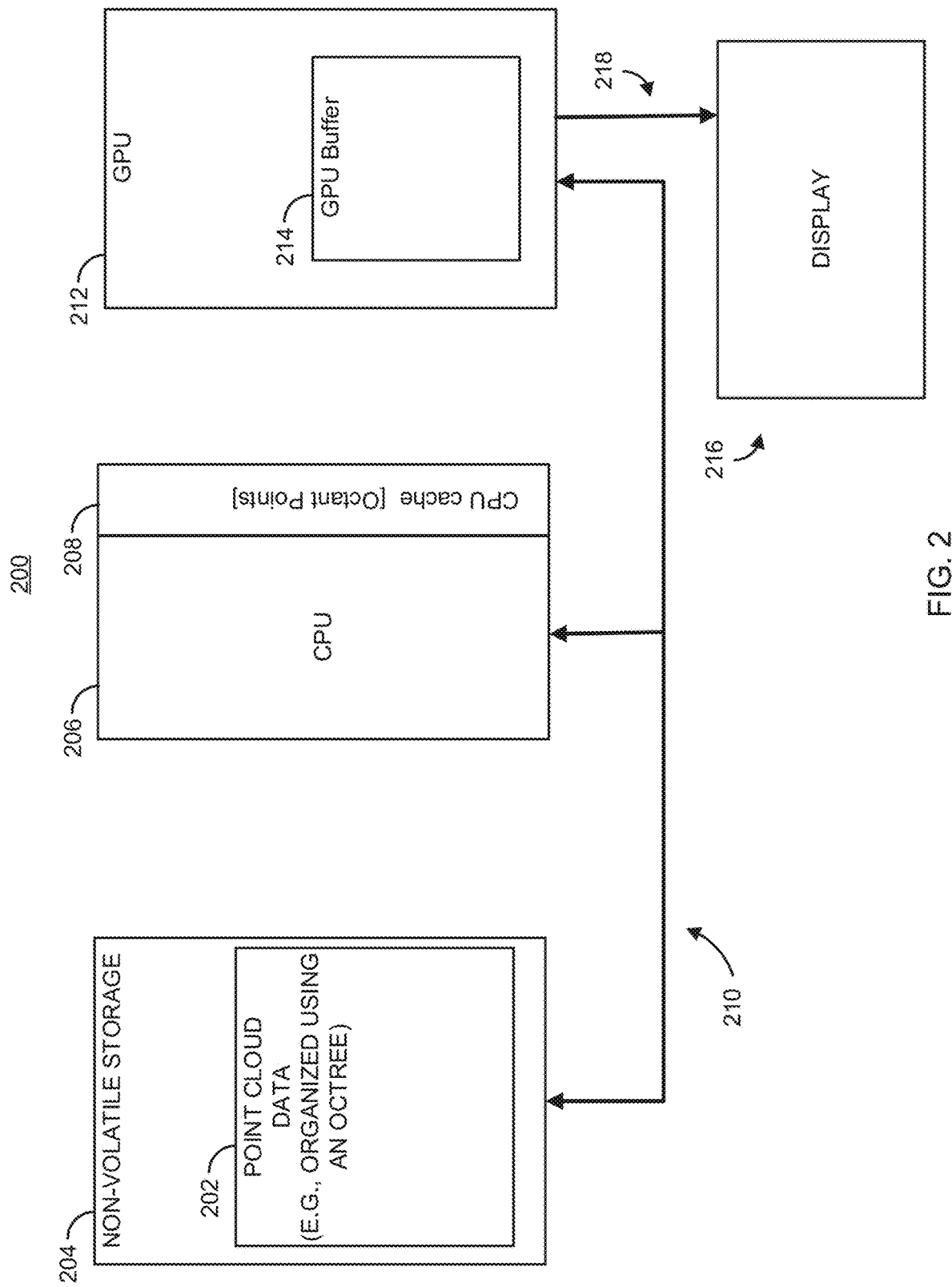
FIG. 2 shows an example of a system for detecting manipulations of point cloud data in accordance with some aspects of the disclosed subject matter.

The present disclosure provides system and methods which can, for example, include systems, methods, and media, for detecting manipulations of point cloud data.

FIG. 1A shows an example 100 of a cross-sectional view of point cloud points being captured by two LiDAR scanners. In general, certain LiDAR scanners can generate information about distances to points in a scene and/or color information by capturing rotating around an axis, and capturing data at predetermined angular intervals in multiple dimensions. For example, a LiDAR scanner can rotate about a central axis at a particular polar angle $\theta$ and can capture data at discrete azimuthal angle intervals $\Delta\phi$ around the central axis, or vice versa (or through some combination of rotations). After scanning at a particular polar angle $\theta$ (or azimuthal angle $\phi$) the laser can be adjusted a discrete amount $\Delta\theta$ to a new polar angle, at which another scan at the various discrete azimuthal intervals $\Delta\phi$ can be captured. As shown in FIG. 1A, as the polar angle changes, the distance between points in scene space along the radial direction can change due to the different distances that the laser travels before encountering an object. For example, all else being equal, the farther an object in a scene is from the LiDAR scanner, the farther apart the points in the point cloud representing that scene point will be. For example, the distance $r_1$ between a first point and a second point along a horizontal surface (e.g., a floor) can be smaller than the distance $r_2$ between the second point and third point due to the difference in polar angle when the two points were captured.

The LiDAR scanners show in FIG. 1A are examples of terrestrial LiDAR scanners. The scanner functions via a laser that is rapidly reflected off of a rotating mirror in the center of the unit. When the laser beam intersects an object it bounces back to the scanner where the laser's return time is recorded. This time is used to calculate a time-of-flight distance from the device. The terrestrial LiDAR scanner performs distance measurements millions of times throughout a 360 degree horizontal and 300 degree vertical volume. A panoramic photograph is also generated along with the distance measurements to collect color information. The distance measurements combined with the horizontal and vertical angles of the emitted laser result in a data set of three-dimensional coordinates relative to the scanner. A single scan (or multiple combined scans) can create many distance measurements and many points—a data set that is sometimes referred to as a point cloud. Due to the limited vertical range, a sixty degree conic volume directly underneath and above the scanner is not visible from a single scan. Additional scans from different viewpoints can be used to fill in missing data.

FIG. 1B shows an example 150 of a top-down view of point cloud points being captured by two LiDAR scanners. Similarly to the situation above for the distance between points in the radial direction, the distance between points in the lateral direction can increase as distance from the LiDAR scanner increases. For example, as shown in FIG. 1B, the lateral distance $y_1$ in scene space between two points captured at a first polar angle $\theta_1$ is smaller than the lateral distance $y_2$ in scene space between two points captured at a second polar angle $\theta_2$. This can generally occur because the LiDAR can be thought of as sweeping out a cone with a central axis congruent with the central axis of the LiDAR at each polar angle, and mapping the intersection of the cone with points in the scene. Objects that are farther from the LiDAR then lie on a circle having a larger radius than objects closer to the LiDAR, and accordingly the Euclidean distance between two points separated by the same angle is larger on the larger circle.

As shown in FIGS. 1A and 1B, when two scans are combined (e.g., from two LiDAR scanners, or from one LiDAR scanner used in two different locations) into a single point cloud, the distance between points in the scene that are represented in the point cloud varies due to the interaction between the two scans. In general, as described above, the density of points from a single scan can be expected to generally decrease with distance from the scanner, but when two or more scans are combined, the density can fluctuate in more complicated patterns due to the combined effect of the multiple scans. For example, if the density of the points were plotted from a point cloud that includes data from multiple scans, the density at points in the scene between the two scan locations can form a pattern similar to a wave interference pattern. Note that the description of FIGS. 1A and 1B is related to a particular type of LiDAR scan, and other scanning techniques can be used to capture depth information of a scene. In general, it can be expected that, all else being equal, objects that are father from the scanner will be captured at lower lateral resolution than points that are closer to the scanner. Note that the LiDAR techniques described above are one example of how a LiDAR system can capture data, and other configurations exist, such as scanners that capture depth information for many points at once (e.g., using a 1 dimensional field of view rather than single points, for example, by projecting a plane of light toward the scene, rather than a single point) at each angle. Additionally, techniques described herein can be applied to other types of depth scanning, such as through the use of time of flight or structured light depth cameras, as objects that are farther from the light source can be expected to be captured at lower lateral resolution (e.g., because of differences in direction of the light toward different portions of the scene).

As described above, terrestrial LiDAR scanners can collect data samples via a rotating laser. As these samples are based on angular steps, assumptions can be made about the resultant data based on the distance an object is from the scanner. Using trigonometry, the distance w can be represented as:

$$w = h \tan(\theta_w) \quad (1)$$

The radial distance between a pair of samples, for example $r_2$, can be represented as:

$$r_2 = h(\tan(\theta_w + 2\Delta\theta) - \tan(\theta_w + \Delta\theta)) \quad (2)$$

In the generalized case, the distance (d) between any sample (X) and the previous sample can be represented as:

$$d = h(\tan(\Delta\theta X) - \tan(\Delta\theta(X-1))) \quad (3)$$

where k is the angular step-size between samples. In this case, d increases with X approaching infinity as $$X = \frac{\pi}{2} \text{ radians (90 degrees)}.$$

For similar reasons, due to the angle-based capture method used by LiDAR scanners, the number of data points captured per distance decreases as distance from the scanner increases. For example, an object close to the scanning location will intersect many scanning angles and be represented by many points in the resulting data. The same object farther away from the scanner will intersect fewer angles, and thus will be represented by less points. Given data from a single scan, every object in the data set follows this relationship. As described below in connection with FIGS. 11, 12, 15, 17, and 21-23, this can be visualized by calculating the density of points in a given region of scanned space. For every point in the data set, a count of the number of other points within a sphere of a set radius around the original point can be collected. This count can represent a density value with the density increasing with the addition of more nearby points. The relative spacing between points increases with distance from the scanner, thereby reducing the density value for these points.

A single unaltered scan shows a smooth point density gradient across the data set. Barring any scanning or processing artifacts, this gradient should be smooth and uninterrupted. If an object is inserted into an existing scan data set, the point density of the object is unlikely to match this gradient from the original scan. The added object's density values are likely to be very different from the densities in the original scan. If subsampling resulted in an even, unchanging density across the entire object, this would stand out as well if the scan has not also been subsampled at the same density.

FIG. 2 shows an example 200 of a system for detecting manipulations of point cloud data in accordance with some aspects of the disclosed subject matter. As shown in FIG. 2, point cloud data 202 representing one or more scenes can be stored using non-volatile storage 204, such as a hard drive, a solid state drive, flash, etc. Additionally or alternatively, in some aspects, point cloud data 202 can be held in volatile memory (e.g., RAM) that has sufficient capacity to store a large file such as point cloud 202. In some aspects, point cloud data 202 can include any suitable number of points of data that collectively represent the state of one or more scenes. Such a point cloud can be generated from one or more LiDAR scans, which can generate very large datasets that can depict, for example, the interior and/or exterior of a home, a crime scene, a historical site, etc. In some cases, point cloud data 202 can include billions of points, and may not have uniform point density. For example, portions of a scene with more detail can be captured at higher point density to make sure that the detail is represented in the point cloud data. Accordingly, point cloud data 202 can include tens of gigabytes of data. In a more particular example, a LiDAR-scanned data set of Frank Lloyd-Wright's 'Taliesin' home and office can include both exterior and interior spaces, intricate details and complex shading features. In such an example, the point cloud can include more than $1.9 \times 10^9$ points requiring about 30 Gigabytes of storage. In this particular example, the Taliesin data set can contain varying point density due to the interaction of various LiDAR scans captured from different locations. In a more particular example, 80 LiDAR scans could be used to make up the full model of Taliesin, and preprocessing of the data set may not include homogenization of point density to preserve high detail of certain objects in the space (a desire common for interior spaces).

In some aspects, point cloud data 202 can be organized using an octree (e.g., as described below in connection with FIG. 4). Such an octree structure can organize points in point cloud data 202 based on which region of the scene the point is located in, which can later be used to determine which groups of points (e.g., nodes in the octree) are potentially within the viewport(s) of the virtual camera(s) representing the viewpoint(s) of a user (or users). Note that the point cloud data itself can be organized using an octree structure (e.g., the sequence of points can be based on the location of the points within the scene) and/or a separate file can be used to map the point in the point cloud data to an octree structure.

In some aspects, system 200 can include a central processing unit (CPU) 206 with cache memory 208. In some aspects, CPU 206 can access information in cache memory 208 without using a bus 210 over which CPU 206 communicates with other hardware, such as non-volatile storage 204, main memory (e.g., RAM) (not shown), a GPU 212, etc. In some aspects, CPU 206 can coordinate operation of at least a portion of system 200, such as by executing an operating system, accessing main memory and/or non-volatile storage 204, etc.

In some aspects, system 200 can include a graphics processing unit (GPU) 212 that can be configured to render graphics to be presented by a display 216. In some aspects, GPU 212 can include buffer memory 214 that can be used, for example, to temporarily store data that can be manipulated by GPU 212 to render graphics that are to be presented to a user using display 216. Display 216 can be any suitable type of display or combination of displays. For example, display 216 can be one or more projectors, flat panel displays, etc., that is part of an immersive virtual reality environment, such as a cave automatic virtual environment (CAVE). As another example, display 216 can be one or more presentation devices (e.g., an LCD display, an OLED display, an AMOLED display, etc.) integrated into a head mounted display (HMD) that can provide a virtual reality and/or augmented reality experience to a user. As yet another example, display 216 can be a television, compute monitor, touchscreen, etc.

In some aspects, GPU 212 can output image data to display 216 over a connection 218. In some aspects, connection 218 can be any suitable connection that can communicate image data from GPU 212 to display 216. For example, connection 218 can be an internal bus connecting GPU 212 to an internal display (e.g., where display 216 is part of a head mounted display, smartphone, tablet computer, etc.). As another example, connection 218 can be a connection to an external display using a cable (e.g., HDMI, Display Port, DVI, etc.), a wireless link, etc.

In some aspects, CPU 206 and/or GPU 212 can execute one or more processes (e.g., one or more of processes 1300, 1400, and 1500 described below in connection with FIGS. 13-15) to detect manipulations of point cloud data. For example, system 200 can analyze the structure and/or one or more characteristics of point cloud data 202 to present and/or detect information indicative of any manipulations of point cloud data 202.

FIG. 3A shows an example 300 organizational structure of a point cloud file that can be used to render a portion of a point cloud in accordance with some aspects of the disclosed subject matter. In some aspects, point cloud data can be organized such that each point is described with a location (e.g., X, Y, and Z coordinates) and color information (e.g., R, G, and B values). In such aspects, each point can each be associated with an index value that can be used to uniquely identify the point, which can be used, for example, when rendering point cloud data to transfer particular points to memory and/or a GPU. In some aspects, a single scan may be organized based on the order in which the points were scanned. For example, the point at index 1 can be the first point recorded in the scan, the point at index 2 can be the second point, and so on. In general, due to the nature of the scanning process, this can cause the points to be organized based on the location within the scene. For example, if the scan started by capturing points from the top down, the points in the file can be similarly organized from the top down, and from one side to the other.

Scans performed by a LiDAR scanner can be stored locally (e.g., on an SD card or other memory inside the scanner) and/or remotely (e.g., wirelessly streamed to a computer connected to the scanner). The initial data set captured by the LiDAR scanner is typically stored in a proprietary format associated with the scanner. After completing all desired scans of a physical space, a user can load the scans using software associated with the scanner manufacturer, such as FARO SCENE or Leica Cyclone. Registration and processing of individual scans is generally carried out using such proprietary software. After preparation of the scans using such software, a user can transform the scan data further, using the same software and/or various other software tools (e.g., third party tools).

Many formats exist for storing this 3D information. For example, one common file format for point cloud data is the XYZ format (examples of which are described in connection with FIGS. 3A to 3C). The XYZ format is an ASCII format with six values per line: three floating point values represent the 3D position of a point and three positive integer values represent an RGB color of the same point. It is important to note that the ordering of points within the point cloud file is unconstrained. This means that in order to find the two closest points the entire file may need to analyzed. This is in contrast to volumetric datasets, such as one might get from a CT scan, in which information is stored for all spatial locations (even "empty" locations). As most of the volume of the data set is "air" and does not need to be stored, unstructured point cloud storage techniques are generally more optimal for storing data representing 3D scans of macroscopic scenes, which is why it is a widely used format.

While point clouds conceptually consist of data stored in an unorganized structure, in practice the order in which points are stored in a file is seldom random. The ordering of points can be visualized by assigning a value to each point in the data set based on its position in the file structure. By normalizing these values and assigning them to a color scale, the file structure can be highlighted as shown in 3D space (e.g., as shown in and described below in connection with FIG. 7). One common data structure, the octree described below in connection with FIG. 4, can speed up processing algorithms performed on the data set by organizing the data in a hierarchical data structure.

Figure 9:
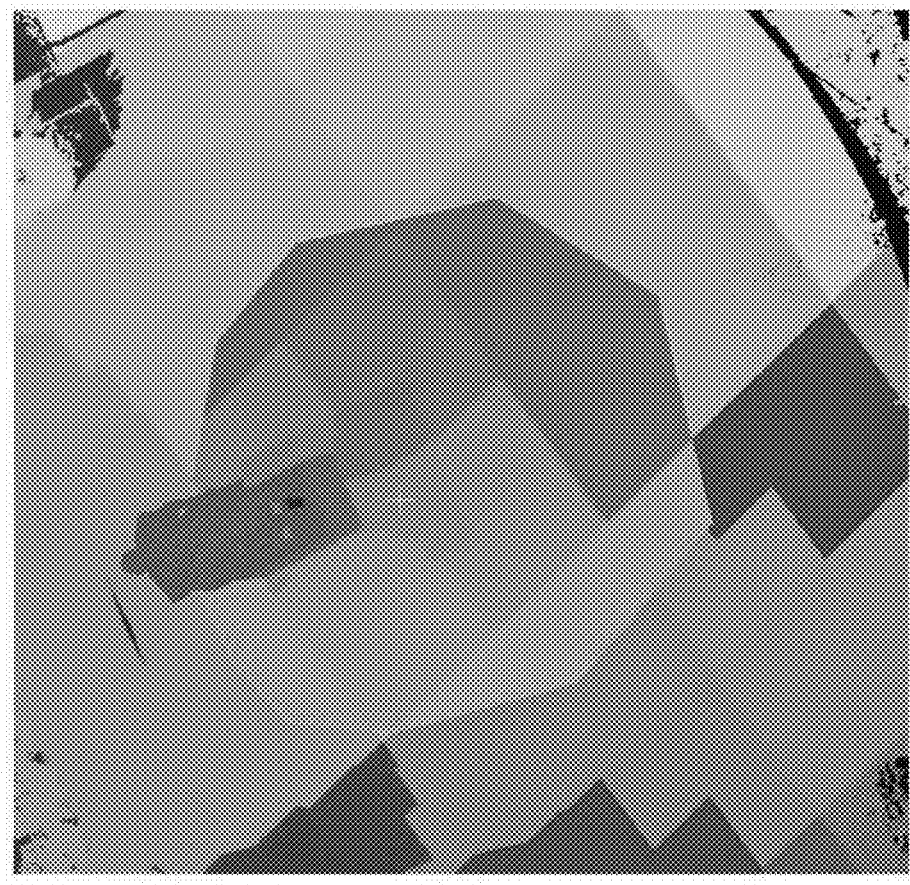
FIG. 9 shows example representations of the point cloud file of FIG. 8 that has been modified to include a higher resolution representation of a portion of the scene inserted at the end of the point cloud file, with the points from the point cloud file mapped to a false color spectrum based on the position of the points within the point cloud file in accordance with some aspects of the disclosed subject matter.

While this data structure is generally used as an internal optimization, remnants of this structure are often evident when a point cloud is saved or exported. An example of this can be seen in FIG. 9 where a model was exported from FARO software into an XYZ ASCII text file. The pattern of octants can be seen as a grid-like pattern overlaying the point cloud. Within a single octant, there is a smooth increase in value, as points are laid out sequentially in the file, and discontinuities are visible across octant boundaries. This is due to the fact that two points that are adjacent in 3D space may be far apart in the file if they cross an octant boundary. This pattern of discontinuities is what allows the octree structure to be discerned. This pattern has no visible effect on the point cloud during normal use, and only becomes apparent when processed and presented in false color based on index value processing algorithm is performed. In the case of an altered point cloud, the original pattern can become disrupted. In the case of FIG. 9, an alteration becomes apparent. Although the octree structure is visible across most of the scene, the region in the center shows an unusual discontinuity. The values here indicate that this entire region lies at the end of the file, even though the areas around it are distributed throughout the file normally. The odd discontinuity is due to a polygonal selection tool that was used to segment this region from one scan, modify it, and paste it onto the other. In this case, the editing software simply inserted the modified region at the end of the existing file. For the unedited points, the existing octree ordering was kept. The edited region had this same ordering initially, but became displaced when it was edited. This type of alteration would be difficult to detect normally, but becomes readily apparent when using techniques described herein.

The usefulness of techniques based on the ordering of points in the file can be limited by techniques that reorder points. In the case of the octree structure analysis, simply randomizing the order of points in the file would remove all evidence of the underlying structure. Generally, point cloud processing software does not do this as part of the normal processing pipeline, so any data set exhibiting a randomized structure may be suspicious on its own. However, if a data set was to be resampled, that may also limit the usefulness of attempting to identify anomalies based on the existing file structure. Subsampling techniques performed in software can leave their own trace of operation. For example, random subsampling techniques used in Cloud-Compare can pick a number of points at random to remove from the data set. In general, points in CloudCompare are stored in an array. In order to increase processing speed, points can be removed by selecting an array index to remove, duplicating the last entry in the array into that index, and then removing the last entry in the array. The result of this process is that points near the start of the data set tend to keep their order, while points near the end tend to have their order randomized as shown in the random subsample representation shown in FIG. 7. If a user is familiar with the original point cloud, it is possible to estimate the amount of random points removed based on the file structure of the resulting data set. For example, if half of the point cloud remains ordered and half does not, it can be inferred that approximately 50% of points would have been removed during a resample operation.

FIG. 3B shows an example 320 organizational structure of a point cloud file sorted by scan that can be used to render a portion of a point cloud in accordance with some aspects of the disclosed subject matter. In some aspects, when multiple scans are combined into a single point cloud, the different scans may be concatenated, such that all points in from one scan are included in the file before any points from any other scan. For example, if the point cloud data includes N points (e.g., as shown in FIG. 3B), a first scan can correspond to index values 1 to n−1, and a second scan can correspond to index values n to N. In some aspects, each scan can be organized in any suitable manner, such as based on the order in which the scan was carried out.

FIG. 3C shows an example 340 organizational structure of a point cloud file sorted by physical location within a scene that can be used to render a portion of a point cloud in accordance with some aspects of the disclosed subject matter. In some aspects, point cloud data, whether based on a single scan or multiple scans, can be organized using an octree structure. For example, the points can be mapped to new index values based on the position of the points within the scene, with points at a root level of the octree (e.g., points that are not within any of the eight octants, but that lie on a border between two or more octants) corresponding to a first set of contiguous index values (e.g., index 1 to index m), points in a first octant corresponding to a first set of contiguous index values (e.g., index m+1 to index n−1), a second octant corresponding to a second set of contiguous index values, etc. In such an example, the points within each octant can similarly be organized based on position within the scene, with points at a first level of the octree coming first, points at a second level coming next, etc.

Figure 4:
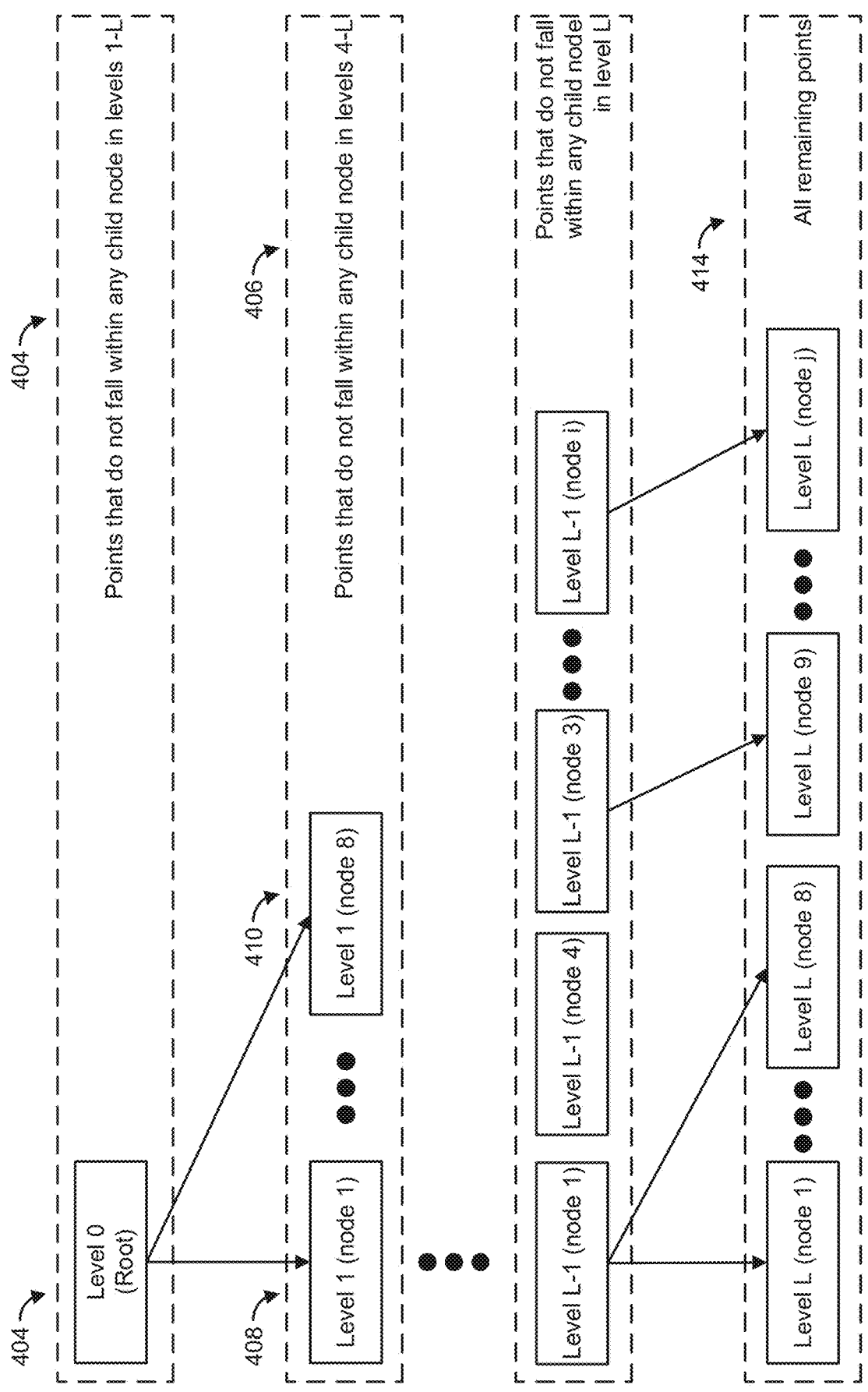
FIG. 4 shows an example of an octree structure that can be used to organize point cloud data in accordance with some aspects of the disclosed subject matter.

FIG. 4 shows an example of an octree structure that can be used to organize point cloud data in accordance with some aspects of the disclosed subject matter. In general, an octree can be characterized as a tree data structure in which internal (i.e., non-leaf) nodes each have exactly eight children. An octree of point cloud data can be created by subdividing the point cloud data into eight regions, and then dividing each of those eight regions into another eight regions, etc., until some condition is satisfied for a particular region and/or a maximum number of levels of division have been reached. Each level of the octree can have one or more nodes (e.g., root node 402) that include data points that do not fall into any of its child nodes. For example, as shown in FIG. 4, root node 402 can include points from the point cloud that lie at the boundary between two or more regions. That is, when the point cloud is subdivided into eight regions, there may be data points that straddle a plane dividing two or more regions. These data points can be associated with the node that is being subdivided. As shown in FIG. 4, a level 404 (sometimes referred to as level 0) can include a single node (e.g., root node 402), and a next level 406 (sometimes referred to as level 1) can include eight nodes (e.g., nodes 408-410), which may each be subdivided into eight regions, associating points that lie on the borders between regions with the node being subdivided, etc. Note that level L does not necessarily include $8^L$ nodes, as some nodes in previous levels may satisfy a condition such that they are not subdivided. For example, if a node includes less than a threshold number of points, the node may not be subdivided again. Note that point cloud data (e.g., point cloud data 202) does not necessarily have a rectangular shape that can be subdivided into equal volumes (e.g., equal cubes, equal rectangular cuboids, etc.). Accordingly, in some aspects, an initial hexahedron (e.g., a cube, a rectangular cuboid, etc.) can be drawn to include all of the points in the point cloud data as a starting point for subdivisions. In some aspects, each node in the octree can be associated with multiple points, and in a point cloud that does not have a uniform density the number of points in each node can vary significantly.

In some aspects, each node in the octree can represent an area of space within the point cloud. For example, each node in level 1 can correspond to one octant of the point cloud data. Accordingly, if the viewing angle and/or position of a virtual camera (or cameras for applications such as a CAVE), some nodes represent portions of the scene that do not intersect the view frustum of the virtual camera, and many of the points associated with these nodes can be excluded from consideration for inclusion in the image being rendered for presentation. Conversely, some nodes represent portions of the scene that intersect or are included entirely within the view frustum of the virtual camera, and points associated with these nodes can be considered for inclusion in the image being rendered for presentation.

Figure 5:
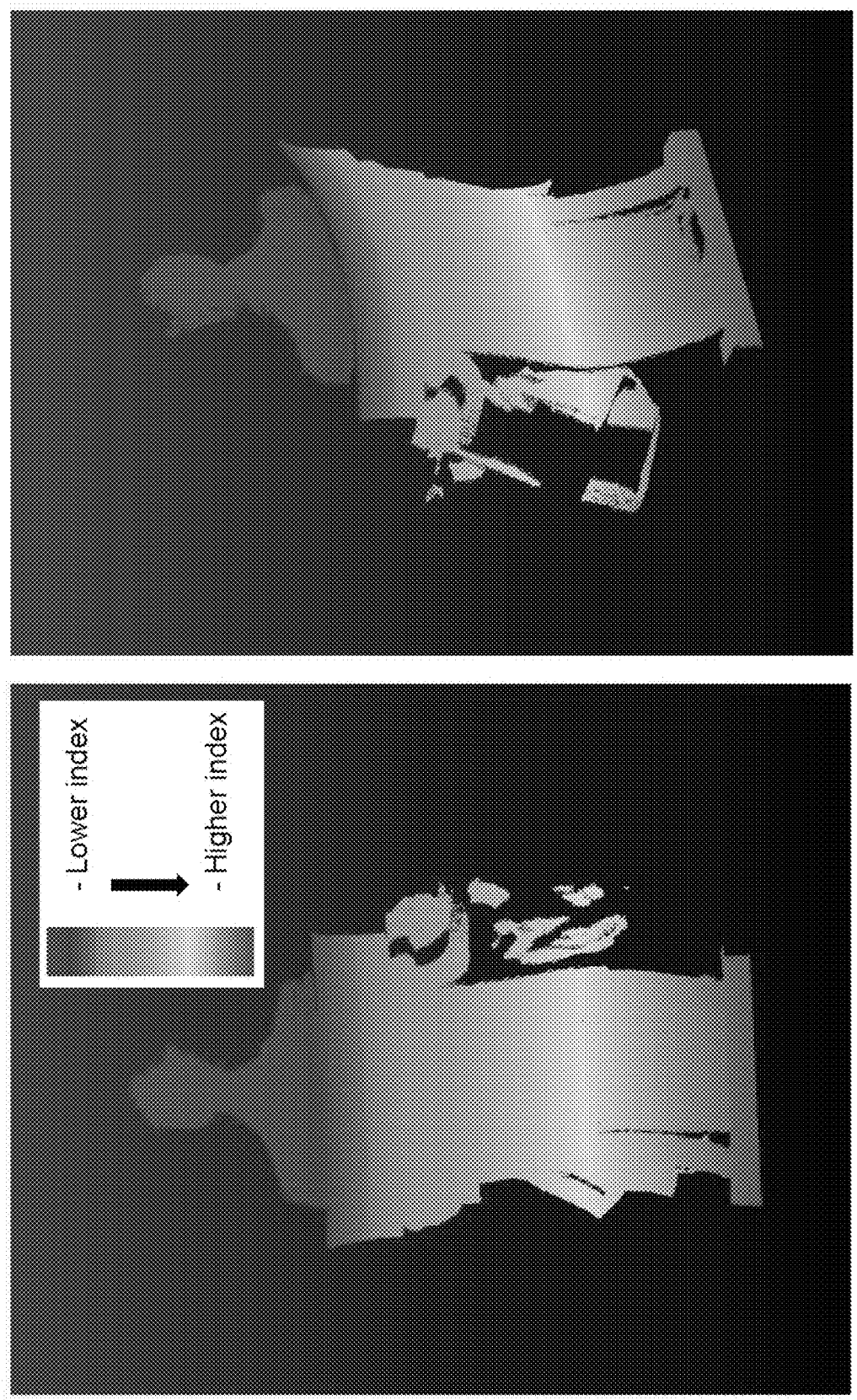
FIG. 5 shows example representations of points from a single LiDAR scan of a statue that are mapped to a false color spectrum based on the position of the point within a point cloud file in accordance with some aspects of the disclosed subject matter.

FIG. 5 shows two views of an example representations of points from a single LiDAR scan of a statue that are mapped to a false color spectrum based on the position of the point within a point cloud file in accordance with some aspects of the disclosed subject matter. As shown in FIG. 5, a file including a single LiDAR scan can be organized such that points with a low index are near the top (or more generally a particular area) of the scan, and the index increases toward the bottom of the scan. In some aspects, were a portion of the point cloud modified, the modified portion may not exhibit the same patterns. In general, when modifying a point cloud (e.g., by adding an object to the scene, or replacing a portion of the scene) it is easiest to add the new points to the end of the file, which would correspond to the highest index values. In the example of FIG. 5, were a portion of the point cloud modified, the highest index points may appear in an unexpected location, such as near the top or middle of the scene, rather than the end as would be expected for points with a high index value.

Figure 6:
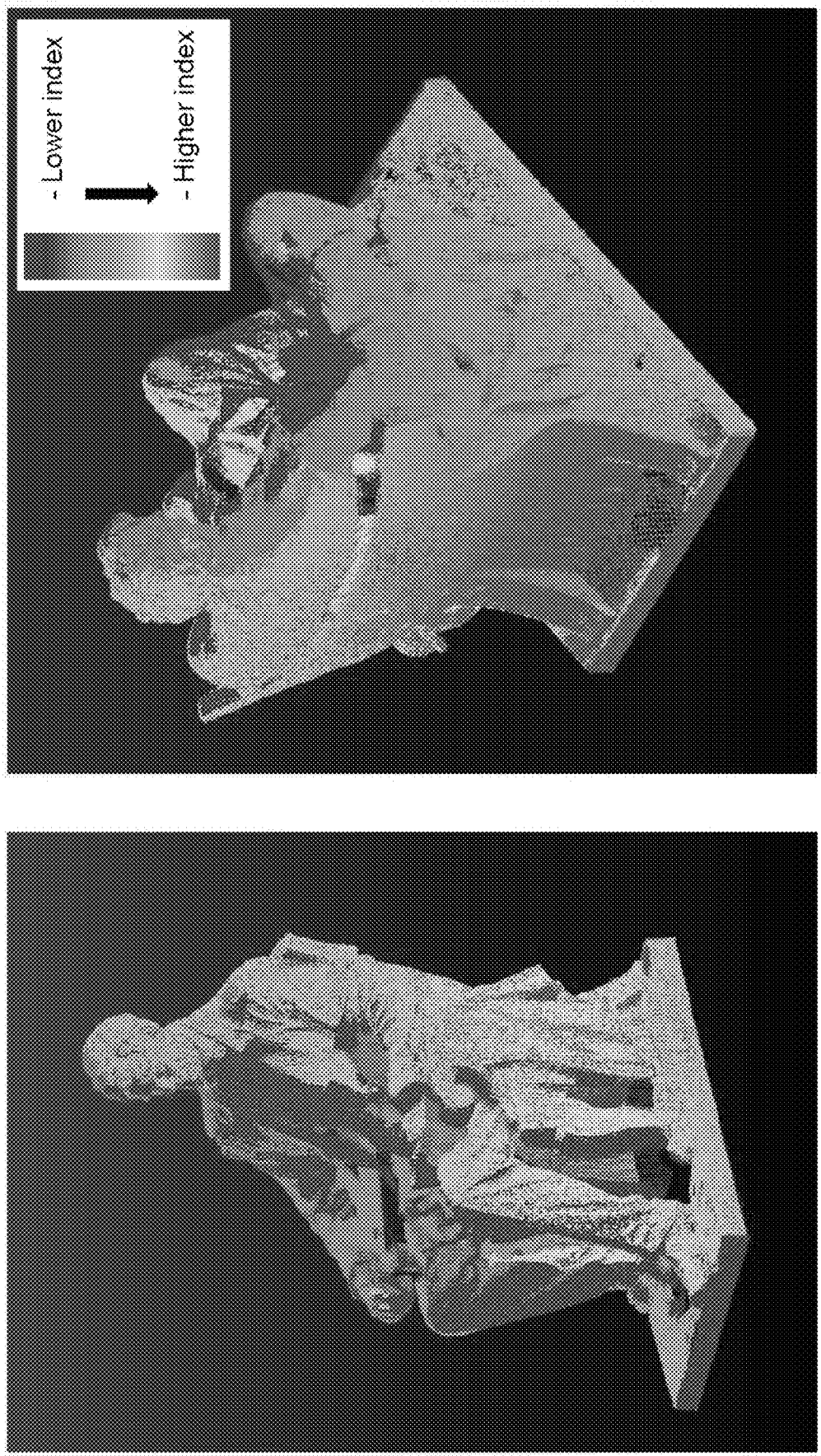
FIG. 6 shows example representations of points from multiple LiDAR scans of a statute that are mapped to a false color spectrum based on the position of the point within a point cloud file in accordance with some aspects of the disclosed subject matter.

FIG. 6 shows example representations of points from multiple LiDAR scans of a statute that are mapped to a false color spectrum based on the position of the point within a point cloud file in accordance with some aspects of the disclosed subject matter. In some aspects, when multiple scans are combined to create a single point cloud, the scans may remain distinct within the file. For example, as shown in FIG. 6, different portions of the statue depicted generally corresponds to a particular portion of the file, such that each side of the statue appears to be fairly homogenous in the false color spectrum. In the example of FIG. 6, were a portion of the point cloud modified, the highest index points may appear in an unexpected location and/or concentrated among other points having a lower index value. In a more particular example, were a portion of the point cloud modified by adding points to the end of the file, those points would appear uniformly red using the false color spectrum of FIG. 6, which would likely be very apparent if it were amid a portion of the scene that generally corresponded to a lower index portion of the file, and would be at least somewhat apparent, due to the concentration of points even if it were amid a portion of the scene that generally corresponded to the higher index portion of the file.

Figure 7:
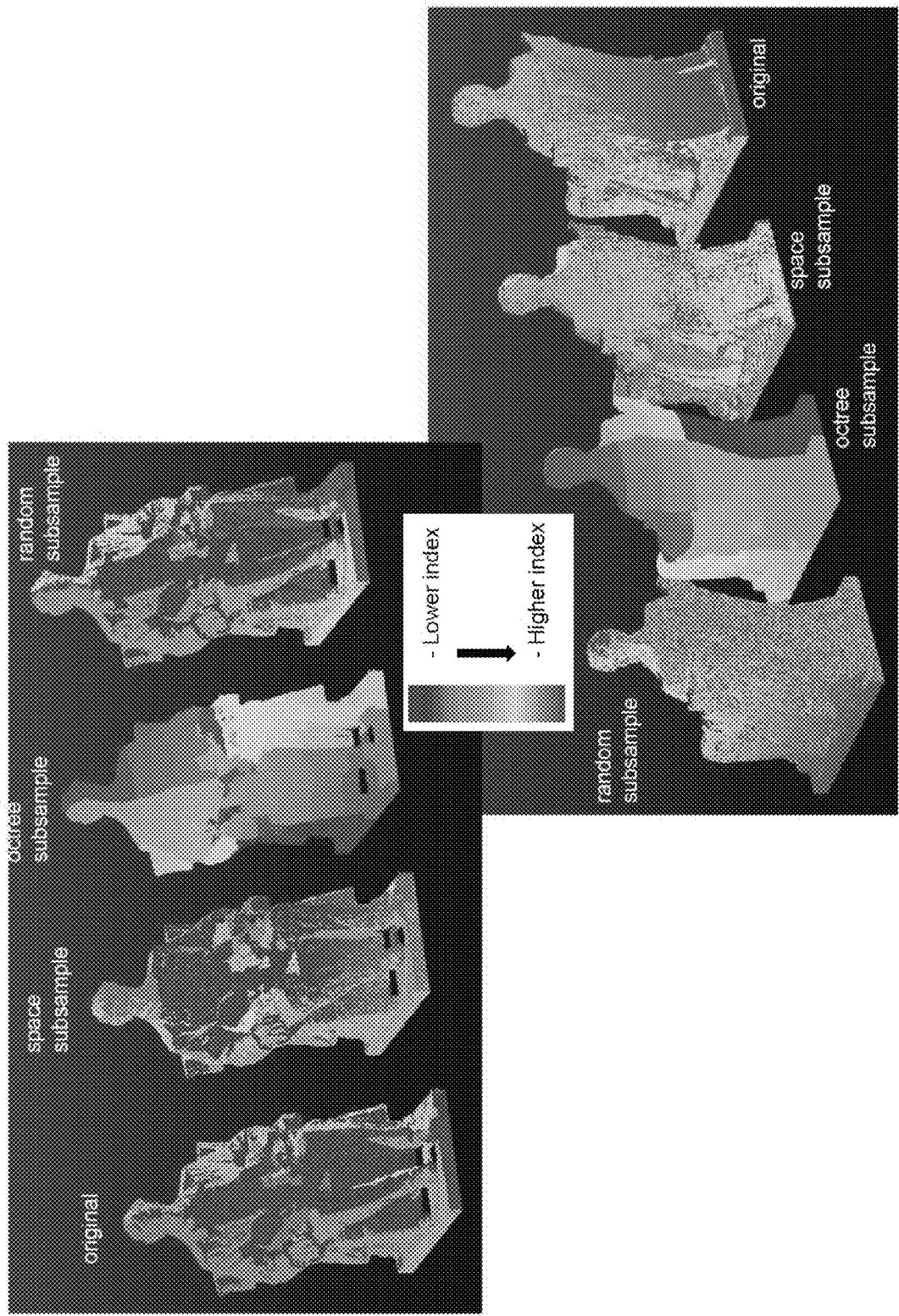
FIG. 7 shows an example comparison of points from multiple LiDAR scans that are mapped to a false color spectrum based on the position of the point within a point cloud file with the points reorganized in the file in various ways prior to the mapping in accordance with some aspects of the disclosed subject matter.

FIG. 7 shows an example comparison of points from multiple LiDAR scans that are mapped to a false color spectrum based on the position of the point within a point cloud file with the points reorganized in the file in various ways prior to the mapping in accordance with some aspects of the disclosed subject matter. As shown in FIG. 7, a point cloud data file can be organized in various ways that may be apparent when the index values are mapped to a false color space. FIG. 7 shows an original organization in which various scans are concatenated and each assigned contiguous index values, similar to that shown in FIG. 6. Also shown in FIG. 7, are an octree organization, a space subsampling organization, and a random subsampling organization. In some aspects, the octree structure can lead to points being grouped based on location within the scene, with relatively sharp demarcations between adjacent regions. In some aspects, space subsampling can lead to a slightly different colorization when compared to the original organization. For example, this can occur due to the fact that space subsampling removes points that are close enough to a set of points based on some minimum distance. This can cause the total number of points in the file to decrease; but points that were not removed retain the original relative locations in the file. When such a decrease occurs, the fewer overall points in the file after the sub-sampling can result in the colorization of the points changing more drastically across the surface of the point cloud. This effect is apparent in FIG. 7 when comparing the original organization to the space subsampled organization. In some aspects, random subsampling can lead to a distribution of index values that is more heterogeneous, as shown in FIG. 7. Note that, in comparing the front and back of the random subsampling example, the randomization algorithm used in to perform the random subsampling does not produce a truly random subsampling, which can have a side effect that results in less of a color distribution for a percentage of points after the random subsampling. A truly random subsampling algorithm would be expected to produce a result with a greater color distribution across both the front and back of the statue. Accordingly, such a color distribution can be expected in the general case of random sub sampling.

Figure 8:
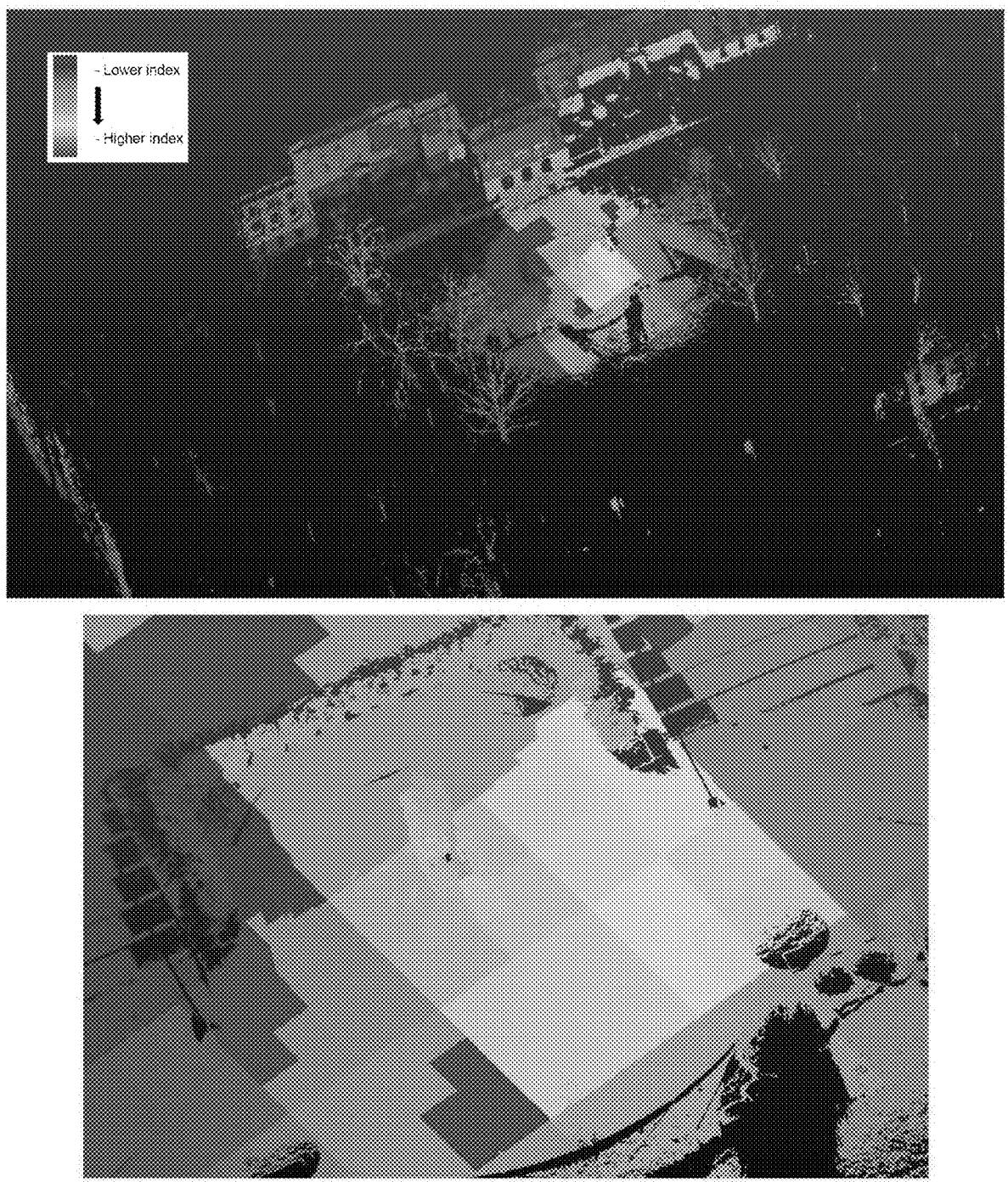
FIG. 8 shows example representations of points from multiple LiDAR scans of a scene that have been organized within the point cloud file based on position of the points within the scene and mapped to a false color spectrum based on the position of the points within the point cloud file in accordance with some aspects of the disclosed subject matter.

FIG. 8 shows example representations of points from multiple LiDAR scans of a scene that have been organized within the point cloud file based on position of the points within the scene and mapped to a false color spectrum based on the position of the points within the point cloud file in accordance with some aspects of the disclosed subject matter. As shown in FIG. 8, a point cloud file representing an outdoor scene that is organized using an octant structure. As shown, different portions of the scene generally correspond in index, with relatively sharp demarcations between different portions of the scene.

FIG. 9 shows example representations of the point cloud file of FIG. 8 that has been modified to include a higher resolution representation of a portion of the scene inserted at the end of the point cloud file, with the points from the point cloud file mapped to a false color spectrum based on the position of the points within the point cloud file in accordance with some aspects of the disclosed subject matter. In particular, a version of the point cloud representation depicted in FIG. 7 was added to the point cloud file in FIG. 8. As shown in FIG. 9, the statue and the surrounding area is comprised of points that are clustered at the end of the file, which is anomalous when compared to the broader scene. This can indicate that the file has been modified to include the statue and surrounding area. For example, as shown in the left panel, the modified portion departs from the general pattern, as the points are all very near the end of the file, and the demarcations between regions is rounded, whereas with an octree structure the demarcations are expected to be linear (reflecting the octree structure used to organize the file).

Figure 10:
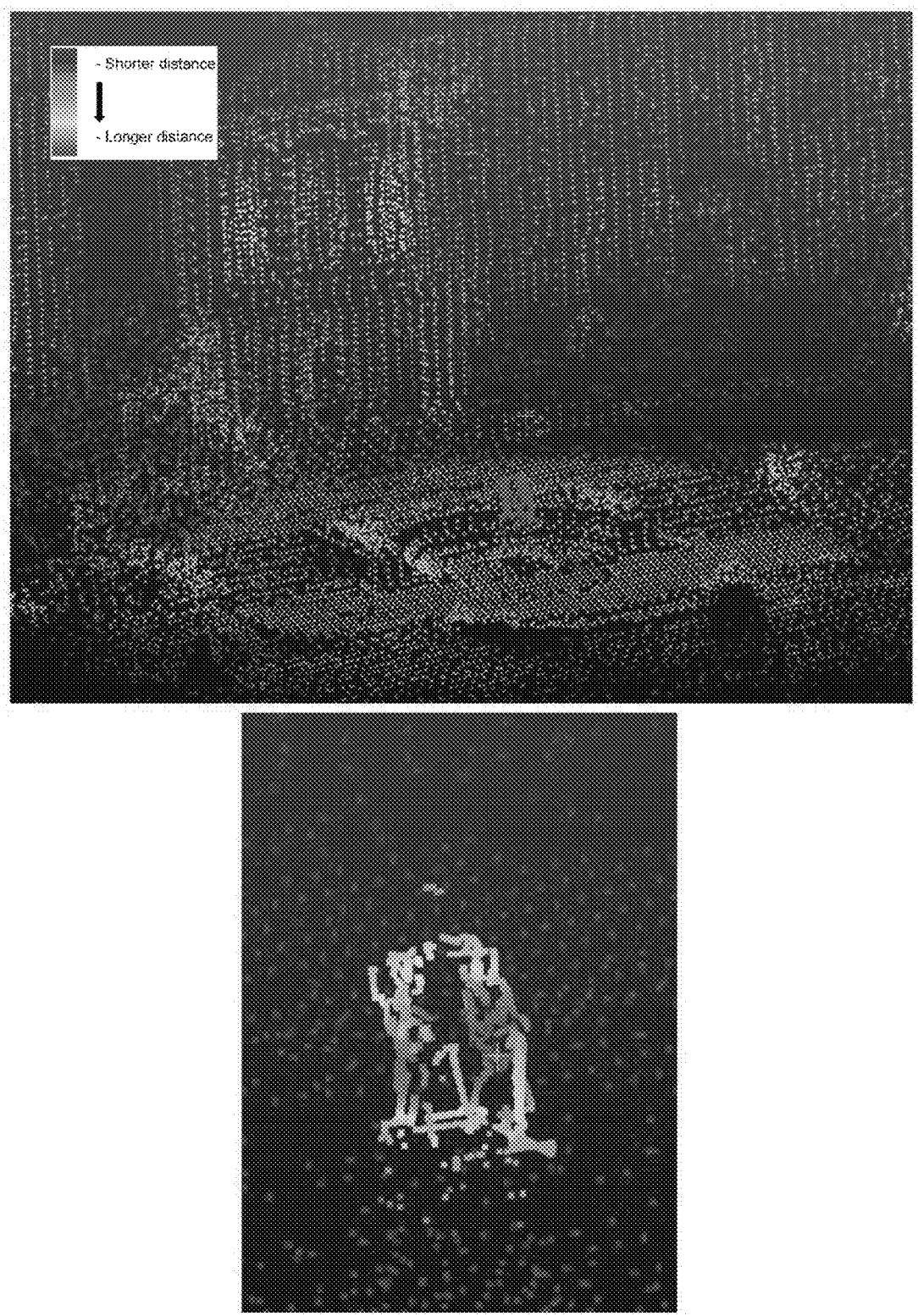
FIG. 10 shows example representations of points from the point cloud file of FIG. 8 with a higher resolution representation of a portion of the scene inserted into the end of the point cloud file mapped to a false color spectrum based on the Euclidean distance between successive points of the point cloud file in accordance with some aspects of the disclosed subject matter.

FIG. 10 shows example representations of points from the point cloud file of FIG. 8 with a higher resolution representation of a portion of the scene inserted into the end of the point cloud file mapped to a false color spectrum based on the Euclidean distance between successive points of the point cloud file in accordance with some aspects of the disclosed subject matter. As shown in FIG. 10, the color of each point is based on the (Euclidean) distance from the point having the previous index value, with only points being shown where the distance is greater than a threshold. The bulk of the point cloud file used to generate FIG. 10 is organized based on an octree structure, which leads to a regular pattern of spacing between points with relatively consistent distances being represented across the scene. However, the statue has a different format, which leads to the distances being inconsistent with the rest of the scene. Note that if the statue were organized using an octree structure before it was added to the point cloud file (i.e., the point cloud file was organized using a first octree, and the statue was organized using a second smaller octree), the anomalies would likely appear differently than what is depicted in FIG. 10. The points rendered in FIG. 10 that correspond to the statue are anomalous because they do not exhibit the same pattern as the rest of the scene. In some aspects, as shown in a comparison between the top view of the scene and the lower view of the scene depicting a smaller portion of the scene, the colors used to illustrate distance can be based on only the points that fall within the volume being presented, rather than the entire scan. For example, the shortest distance represented in the sub-volume represented in the lower view is mapped to the color representing the shortest distance (blue in this case), and the longest distance represented in the sub-volume represented in the enlarged view is mapped to the color representing the longest distance (red in this case). Additionally or alternatively, in some aspects, a user interface element (e.g., a slider) can be used to adjust the total range of distances that are mapped from blue to red.

Figure 11:
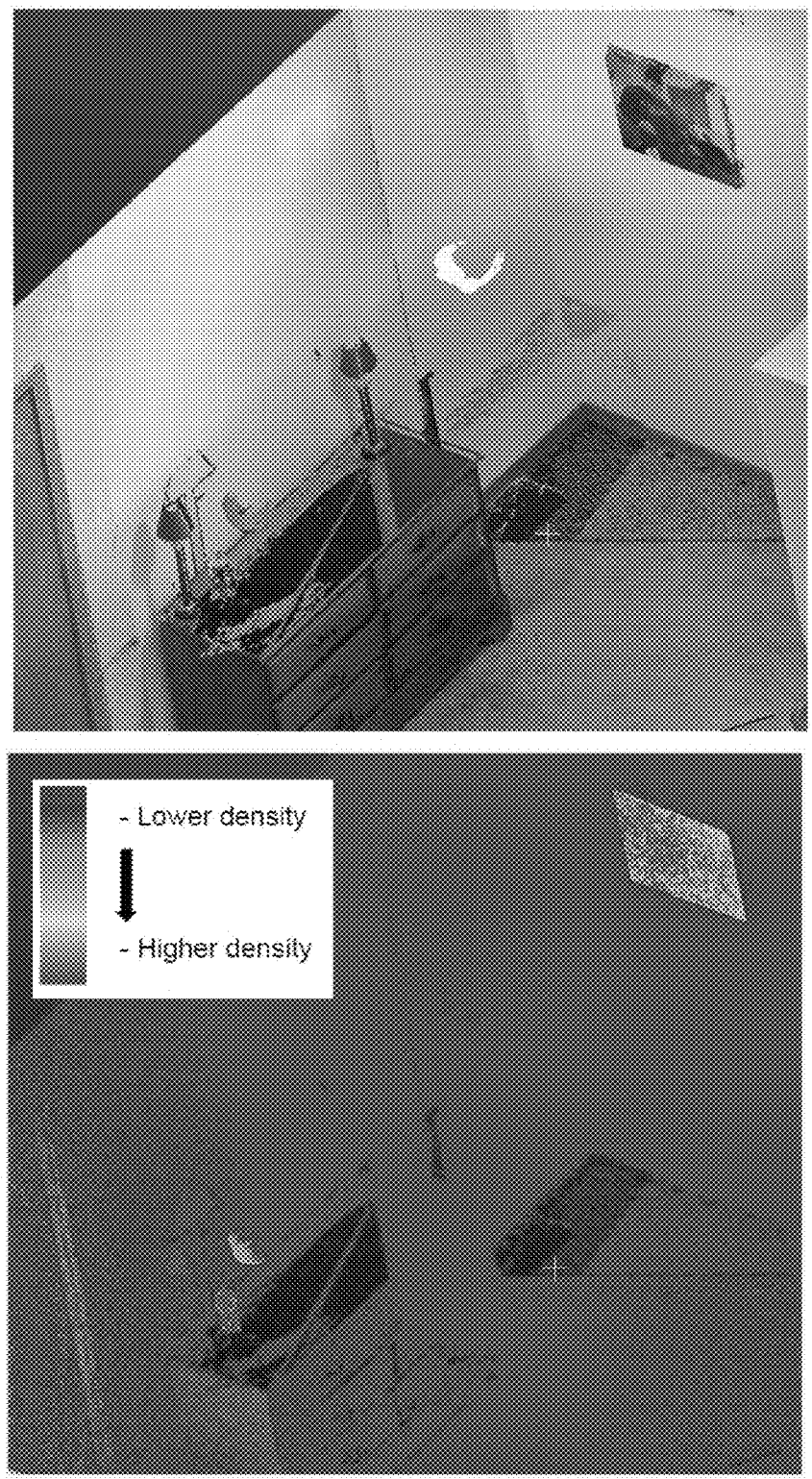
FIG. 11 show an example rendering of points from a point cloud representation of a scene that has been modified to insert objects into the scene and a representation of points from the point cloud file mapped to a false color spectrum based on the density of points in the scene in accordance with some aspects of the disclosed subject matter.

FIG. 11 show an example rendering of points from a point cloud representation of a scene that has been modified to insert objects into the scene and a representation of points from the point cloud file mapped to a false color spectrum based on the density of points in the scene in accordance with some aspects of the disclosed subject matter. As shown in FIG. 11, a portion of a manipulated scan of a scene is rendered that includes several objects that were inserted into the point cloud file. It is not apparent from the rendering of the scan which objects were present during the scan and which have been inserted. However, the lower view shows a representation of the scene that is based on the density between points. As shown in the lower view, a picture that appears to be hung on the wall in the top view and an object that appears to be resting on a dresser have much higher densities than the surrounding portions of the scan, indicating that these objects were likely inserted into the scene. Note that this can show that manipulation of the file has likely occurred, but may not be indicative of whether such an object existed in the original file before any manipulation. For example, as shown in FIGS. 8 and 9, a statue was replaced with a higher resolution version of the same statue, but this is not evident from FIG. 9 alone, which only indicates that the points representing the statue were likely added and were not part of the original point cloud data.

Figure 12:
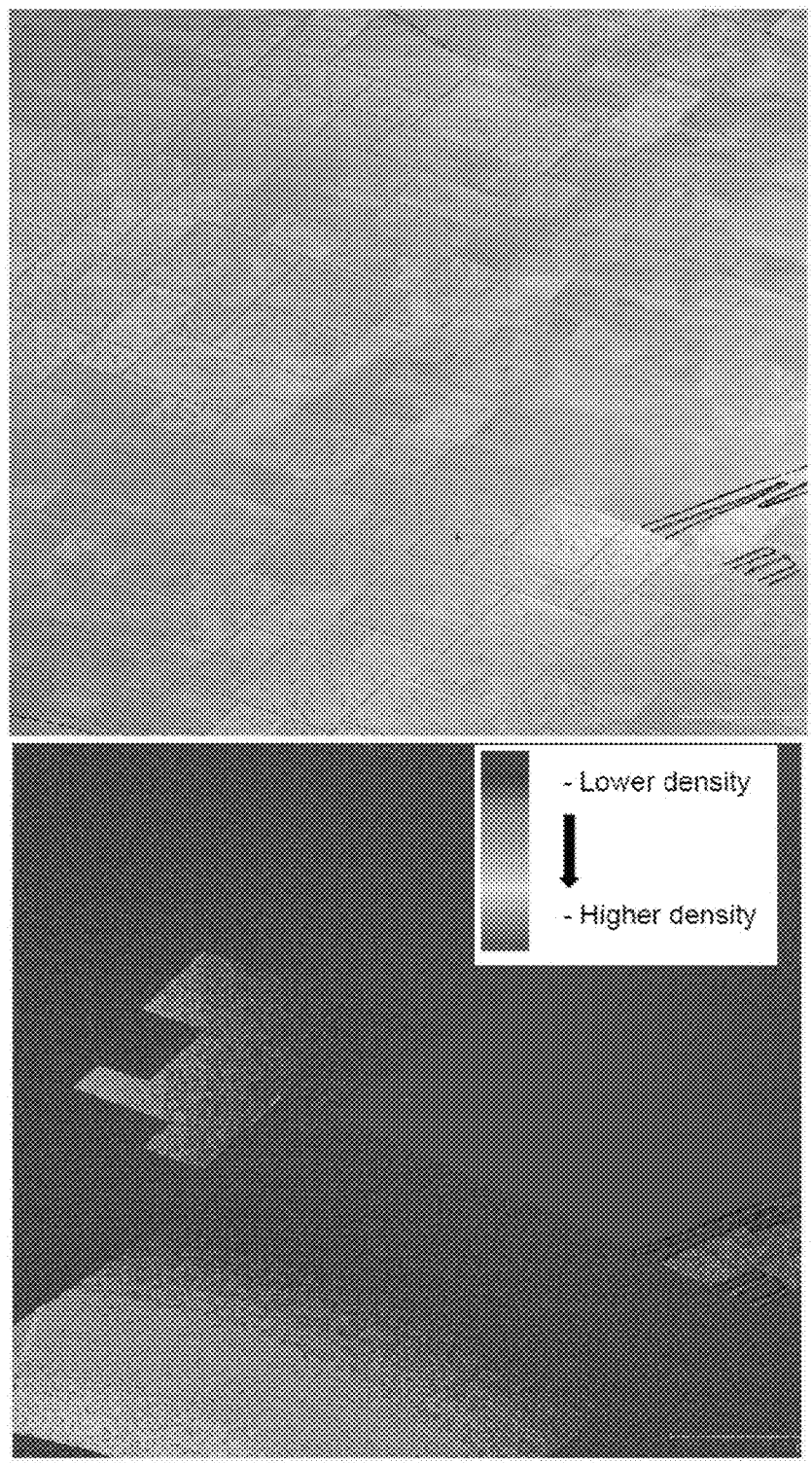
FIG. 12 show an example rendering of points from a point cloud representation of another scene that has been modified to insert objects into the scene and a representation of points from the point cloud file mapped to a false color spectrum based on the density of points in the scene in accordance with some aspects of the disclosed subject matter.

FIG. 12 show an example rendering of points from a point cloud representation of another scene that has been modified to insert objects into the scene and a representation of points from the point cloud file mapped to a false color spectrum based on the density of points in the scene in accordance with some aspects of the disclosed subject matter. As shown in FIG. 12, a portion of a manipulated scan of a scene is rendered that includes several portions that were inserted into the point cloud file. It is not apparent from the rendering of the scan which portions were present during the scan and which have been inserted. However, the lower view shows a representation of the scene that is based on the density between points. As shown in the lower view, several portions of the floor have very different density gradient patterns, indicating that those portions were likely modifications (e.g., copying a portion of the floor and pasting it at a different location).

Figure 13:
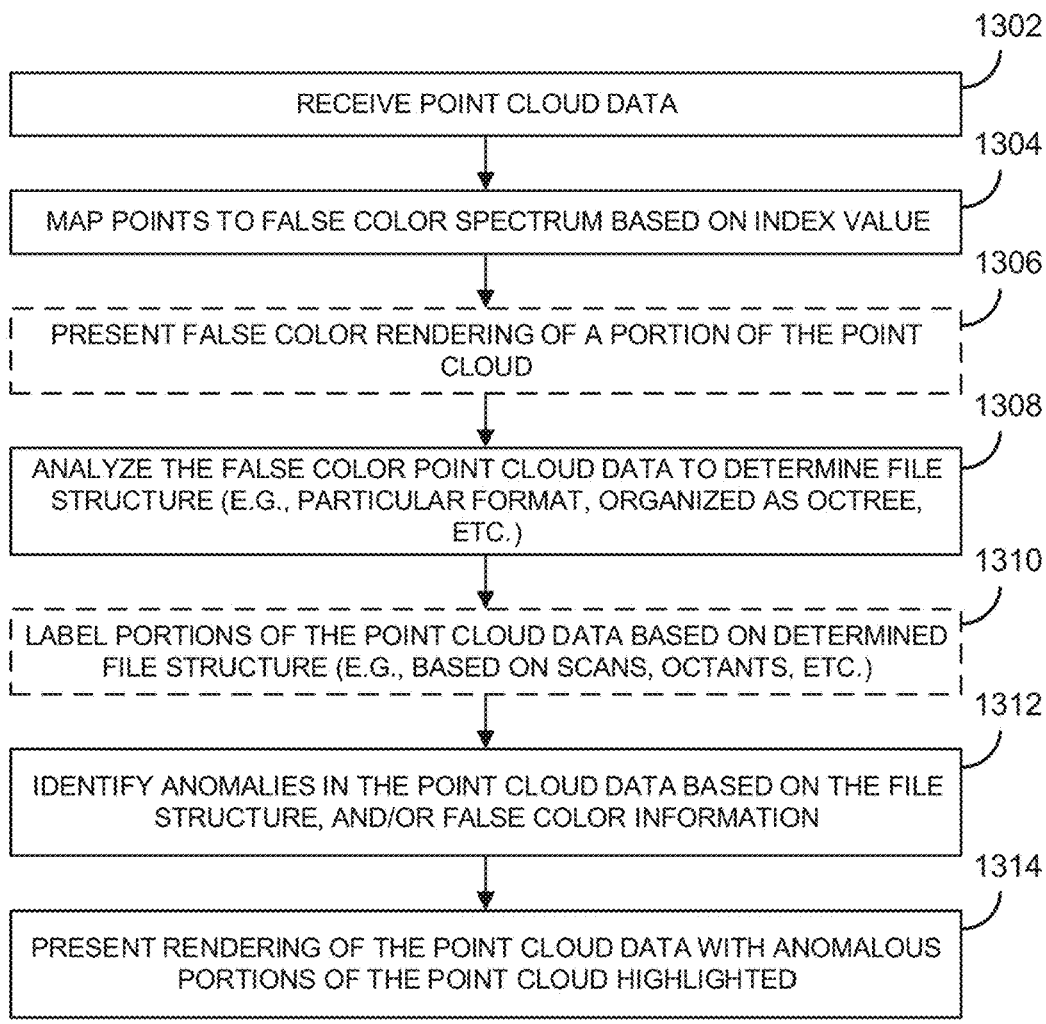
FIG. 13 shows an example of a process for detecting manipulations of point cloud data in accordance with some aspects of the disclosed subject matter.

FIG. 13 shows an example 1300 of a process for detecting manipulations of point cloud data in accordance with some aspects of the disclosed subject matter. In some aspects, process 1300 can begin by receiving point cloud data at 1302 from any suitable source. For example, process 1300 can receive point cloud data from memory (e.g., memory 204), from a network (e.g., a local network, a non-local network, etc.), from a non-transitory computer-readable medium (e.g., an optical data storage device, a Flash memory, etc.).

At 1304, process 1300 can map points in the point cloud data to a false color spectrum based on the index value of the points. For example, a point with a lowest index value (e.g., index 1) can be mapped to one end of the false color spectrum (e.g., blue in the example shown in FIG. 5), and a highest index value (e.g., index N, where the point cloud data includes N points) to another end of the spectrum (e.g., red in the example shown in FIG. 5). In some aspects, other points can be assigned colors on the false color spectrum based on the index value associated with the point.

At 1306, process 1300 can optionally present a false color rendering of at least a portion of the point cloud (e.g., using display 116). In some aspects, process 1300 can use any suitable technique or combination of techniques to render the point cloud data using the false color spectrum (e.g., rather than using the RGB values associated with the points in the original point cloud data).

At 1308, process 1300 can analyze the false color point cloud data to attempt to determine a file structure of the point cloud data. For example, in some aspects, process 1300 can identify one or more regions of the false color point cloud data that are substantially contiguous in color and location. In such an example, process 1300 can use such information to determine whether the point cloud data is likely a single scan (e.g., as shown in FIG. 5), multiple scans concatenated together (e.g., as shown in FIG. 6), one or more scans organized using an octree structure (e.g., as shown in FIG. 7), etc.

As another example, process 1300 can attempt to match the false color point cloud data against common octree subdivision patterns. For example, whether the octree data is organized in a depth first versus breadth first fashion in terms of the order that the octree information is saved on disk. In such an example, octant-based false coloring can be expected to appear differently depending on the organization method of the octree data itself. As another example, some file structures can retain an organization that matches the original LiDAR scanning order, where each individual scan is in an organized format (e.g., based on the order in which the particular scan was conducted) In such an example, the false coloring can be expected to look like "spheres" of similar colors (if progressing down the lower index to higher index scale as shown in the example of FIG. 7) emanating from the individual scan locations. As yet another example, process 1300 can, based on knowledge of common point cloud formats (e.g., .las, .e57, .ptx, .pod, .pcd, .dp, etc.) can attempt to analyze false coloring to determine if color patterns of the file being investigated match against example color patterns that would be expected from these common point cloud formats.

At 1310, process 1300 can optionally associated one or more portions of the point cloud data with label information indicative of the file structure. For example, process 1300 can attempt to assign points to different scans, to assign points to different octants, etc.

At 1312, process 1300 can identify one or more anomalies in the point cloud data based on the file structure, labels, and/or false color information. For example, as described above in connection with FIG. 9, a portion of data that is appended to the end of the file may appear as an anomaly when compared to the expected false color based on the file structure.

At 1314, process 1300 can present a rendering of the point cloud data with one or more potentially anomalous portions of the point cloud data highlighted. For example, the potentially anomalous portions can be rendered using a pattern overlaid (e.g., cross hatching, parallel lines, chevrons, etc.) on the false color rendering. As another example, the potentially anomalous portions can be rendered using different parameters, such as different brightness, different opacity, etc.

Figure 14:
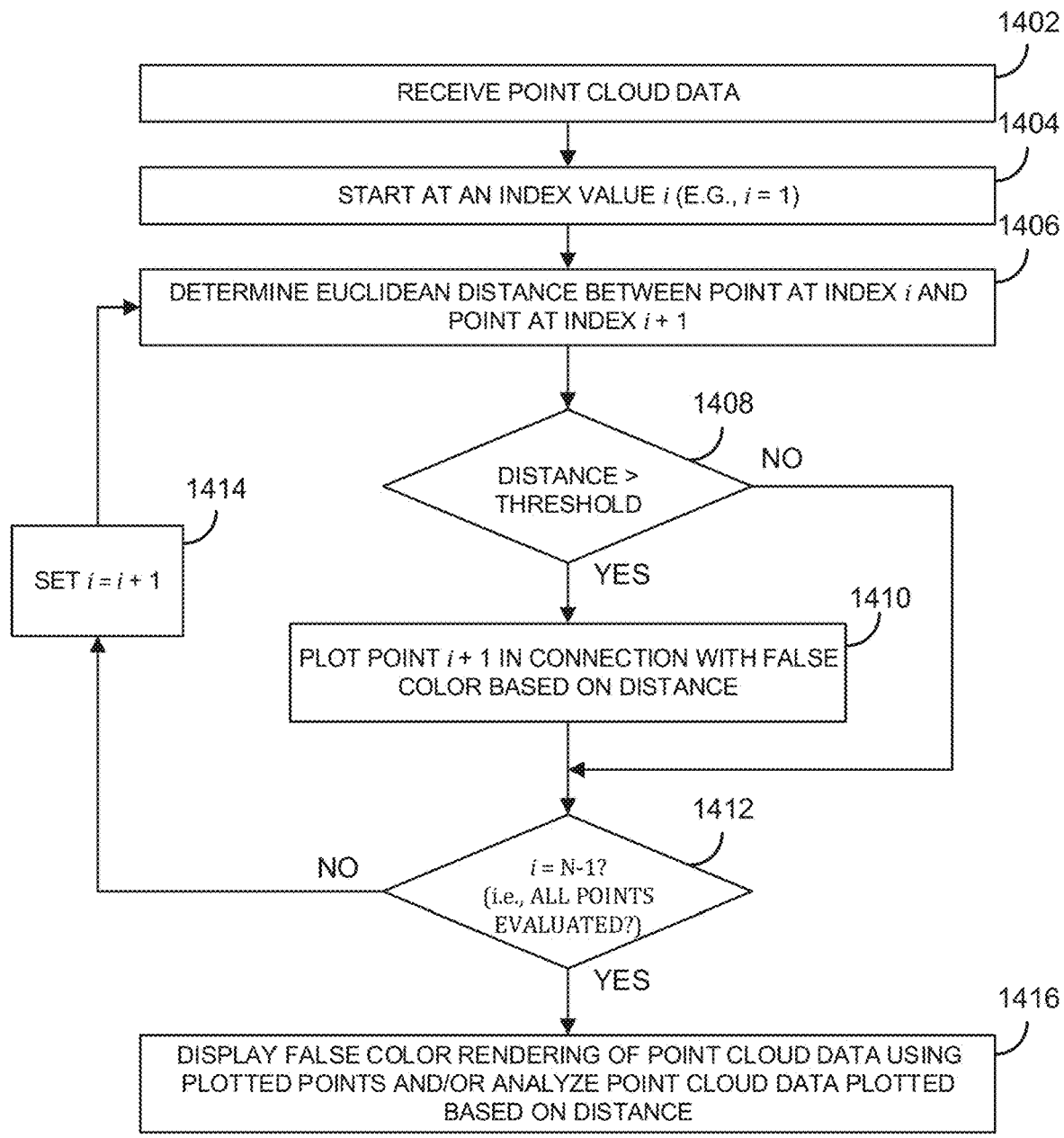
FIG. 14 shows another example of a process for detecting manipulations of point cloud data in accordance with some aspects of the disclosed subject matter.

FIG. 14 shows another example 1400 of a process for detecting manipulations of point cloud data in accordance with some aspects of the disclosed subject matter. In some aspects, process 1400 can begin by receiving point cloud data at 1402 from any suitable source (e.g., as described above in connection with 1302 of FIG. 13).

At 1404, process 1400 can determine an index value at which to begin an analysis. For example, process 1400 can begin at the lowest index value (e.g., index value 1). As another example, process 1400 can begin at a lowest index value included in a particular portion of the point cloud data (e.g., corresponding to a portion of a scene selected for rendering based on the point cloud data). For convenience, process 1400 is described as starting at index value 1, but this is merely an example, and process 1400 can begin at any suitable index value.

At 1406, process 1400 can determine a Euclidean distant between the point at index i and the point at index i+1. For example, process 1400 can find the distance using the Pythagorean formula in three dimensions. As another example, process 1400 can find the distance by determining the magnitude of a vector between the XYZ locations in scene space of the two points.

At 1408, process 1400 can determine whether the distance between the two points is greater than (or greater than or equal to) a threshold distance. In some aspects, the threshold distance can be either set manually, or automatically calculated based on, for example, an average (or some other statistical means) of the distances between neighboring points in a file.

If process 1400 determines at 1408 that the distance is greater than the threshold ("YES" at 1408), process 1400 can move to 1410. At 1410, process 1400 can plot the point at index i+1 in connection with a false color based on the distance between the points at index i and index i+1. Otherwise, if process 1400 determines at 1408 that the distance is not greater than the threshold ("NO" at 1408), process 1400 can move to 1412. That is, process 1400 can omit assigning a false color value to the point at index i+1.

At 1412, process 1400 can determine whether each pair of index values have been evaluated. For example, process 1400 can determine whether the current index i is equal to one less than the total number of index values being evaluated (e.g., N−1). Note that the largest index value being evaluated may not be the largest index value in the point cloud file, for example, when only a portion of the point cloud is being analyzed the largest index may be lower than the maximum index in the file.

If process 1400 determines at 1412 that there are more points to be evaluated ("NO" at 1412), process 1400 can move to 1414 and can move to the next pair of points (e.g., by incrementing the current index to i+1), and return to 1406. Otherwise, if process 1400 determines at 1412 that all points have been evaluated ("YES" at 1412), process 1400 can move to 1416.

At 1416, process 1400 can present a rendering of the plotted points using a false color spectrum based on the distance from the previous point. Additionally or alternatively, in some aspects, process 1400 can identify anomalous regions of the point cloud data based on the plotted points and the distances associated with those points. For example, if most plotted points fall within a relatively narrow range, regions with points that are outside of that range can be identified as anomalous. As described above in connection with FIG. 10, such anomalies can be apparent from viewing the false color rendering of the point cloud.

Note that while process 1400 is depicted as a serial process through which each pair of points is considered in succession, this is merely an example, and multiple pairs of points can be considered in parallel. Additionally, in some aspects, the points can be presented (e.g., via display 216) as the points are plotted, rather than presenting only after all points have been considered.

Figure 15:
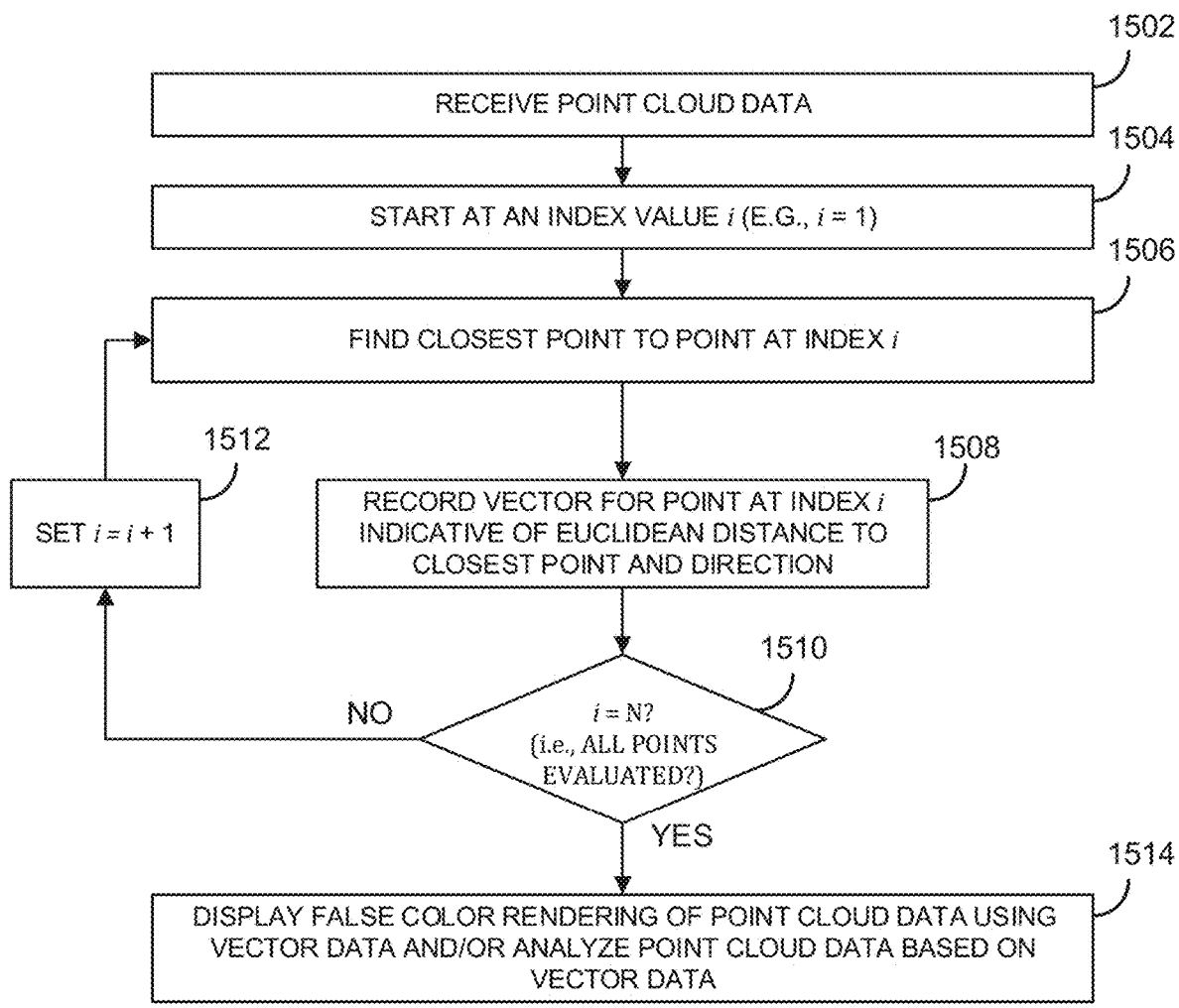
FIG. 15 shows yet another example of a process for detecting manipulations of point cloud data in accordance with some aspects of the disclosed subject matter.

FIG. 15 shows yet another example 1500 of a process for detecting manipulations of point cloud data in accordance with some aspects of the disclosed subject matter. In some aspects, process 1500 can begin by receiving point cloud data at 1502 from any suitable source (e.g., as described above in connection with 1302 of FIG. 13).

At 1504, process 1500 can determine an index value at which to begin an analysis. For example, process 1500 can begin at the lowest index value (e.g., index value 1). As another example, process 1500 and begin at a lowest index value included in a particular portion of the point cloud data (e.g., corresponding to a portion of a scene selected for rendering based on the point cloud data). For convenience, process 1500 is described as starting at index value 1, but this is merely an example, and process 1500 can begin at any suitable index value.

At 1506, process 1500 can determine which point of the point cloud is closest in scene space using any suitable technique or combination of techniques. For example, in some aspects, process 1500 can use octree information to find a group of points that are closest based on the node associated with the point being considered. As another example, in some aspects, process 1500 can draw a sphere centered at the point and determine how many (if any) points are located within the sphere. If more than one point is within the sphere the radius can be decreased, if no points are within the sphere the radius can be increased. Increases and decreases of the sphere radius can be carried out until only a single point is within the sphere. Alternatively, in some aspects, if less than a threshold number of points is within the sphere, the distance to each can be calculated and the closest point can be located based on a comparison of the distances. In some embodiments, the number of points within a sphere of a particular radius can be recorded and used as an indication of the density of the point cloud at each point. For example, a 1 centimeter (cm) sphere can be drawn around a point and the number of other points that fall within the sphere can be used as a value indicative of density. Such a calculation can be made for each point in a point cloud, or for selected points (e.g., the scene can be subdivided into relatively small volumes, and the calculation can be made for one point per volume).

At 1508, process 1500 can record a vector for the point being considered (e.g., the point at index i) that is indicative of the Euclidean distance to the closest point and the direction in which the closest point is located. Additionally or alternatively, in some aspects, process 1500 can record the Euclidean distance to the closest point.

At 1510, process 1500 can determine whether each point to be evaluated has been evaluated. For example, process 1500 can determine whether the current index i is equal to the total number of index values being evaluated (e.g., N). Note that the largest index value being evaluated may not be the largest index value in the point cloud file, for example, when only a portion of the point cloud is being analyzed the largest index may be lower than the maximum index in the file.

If process 1500 determines at 1510 that there are more points to be evaluated ("NO" at 1510), process 1500 can move to 1512 and can move to the next pair of points (e.g., by incrementing the current index to i+1), and return to 1506. Otherwise, if process 1500 determines at 1512 that all points have been evaluated ("YES" at 1510), process 1500 can move to 1514.

At 1514, process 1500 can present a rendering of the point cloud data based on the vector information associated with point cloud data points. For example, each point to be rendered can be assigned a false color based on the magnitude of the vector associated with the point. As another example, each pixel to be rendered can be assigned a false color based on the average (e.g., mean, median, mode) magnitude of points that coincide with the pixel. As yet another example, each point to be rendered can be assigned a false color based on the number of points that fall within a sphere of a predetermined radius around the point. As still another example, each pixel to be rendered can be assigned a false color based on the average (e.g., mean, median, mode) number of points that fall within a sphere of a predetermined radius around each point that coincides with the pixel.

Additionally or alternatively, in some aspects, process 1500 can identify anomalous regions of the point cloud data based on the vector information. For example, the distance to the closest point can generally vary relatively smoothly due to the techniques for capturing point cloud data. In some aspects, process 1500 can identify discontinuities in the distance information at which the information does not vary smoothly, and can determine whether the discontinuity is likely due to modifications by determining whether the distance to the points on both sides of the discontinuity are similar (e.g., discrepancies in density are likely to occur when there is a discontinuity in the depth of the scene). Additionally or alternatively, in some aspects, process 1500 can analyze the data at various level of detail to attempt to identify anomalous regions, such as discontinuities. For example, a relatively large difference (e.g., outside of an expected range) in density between higher and lower levels of data organized using an octree structure can reveal the presence of a discontinuity. Additionally or alternatively, in some aspects, process 1500 can use other techniques, such as 3D edge detection techniques, to attempt to identify anomalous regions.

In some aspects, process 1500 can determine the likely location of one or more scanners that were used to capture the point cloud information based on the vector information. For example, as described above in connection with FIGS. 1A and 1B, points tend to diverge in space as distance from the scanner increases. Accordingly, in many cases, the closest point tends to be in the direction of the scanner and accordingly many of the vectors can be expected to point toward the scanner location. Process 1500 can analyze the vector information to find areas in which the vector directions are relatively uniform and/or smooth indicating a relative lack of interference from another scanner, and can extend the vectors in this region to find where an intersection lies, which is likely to be relatively close to the scanner location. Note that the heights of objects with respect to the scanner can affect the ability to find the precise scanner location. In a particular example, on surfaces (e.g., such as floors) that are relatively flat the vectors may tend to extend along the surface of the floor, while the scanner may have been located above the floor (e.g., supported by a tripod or elevated surface).

Figure 21:
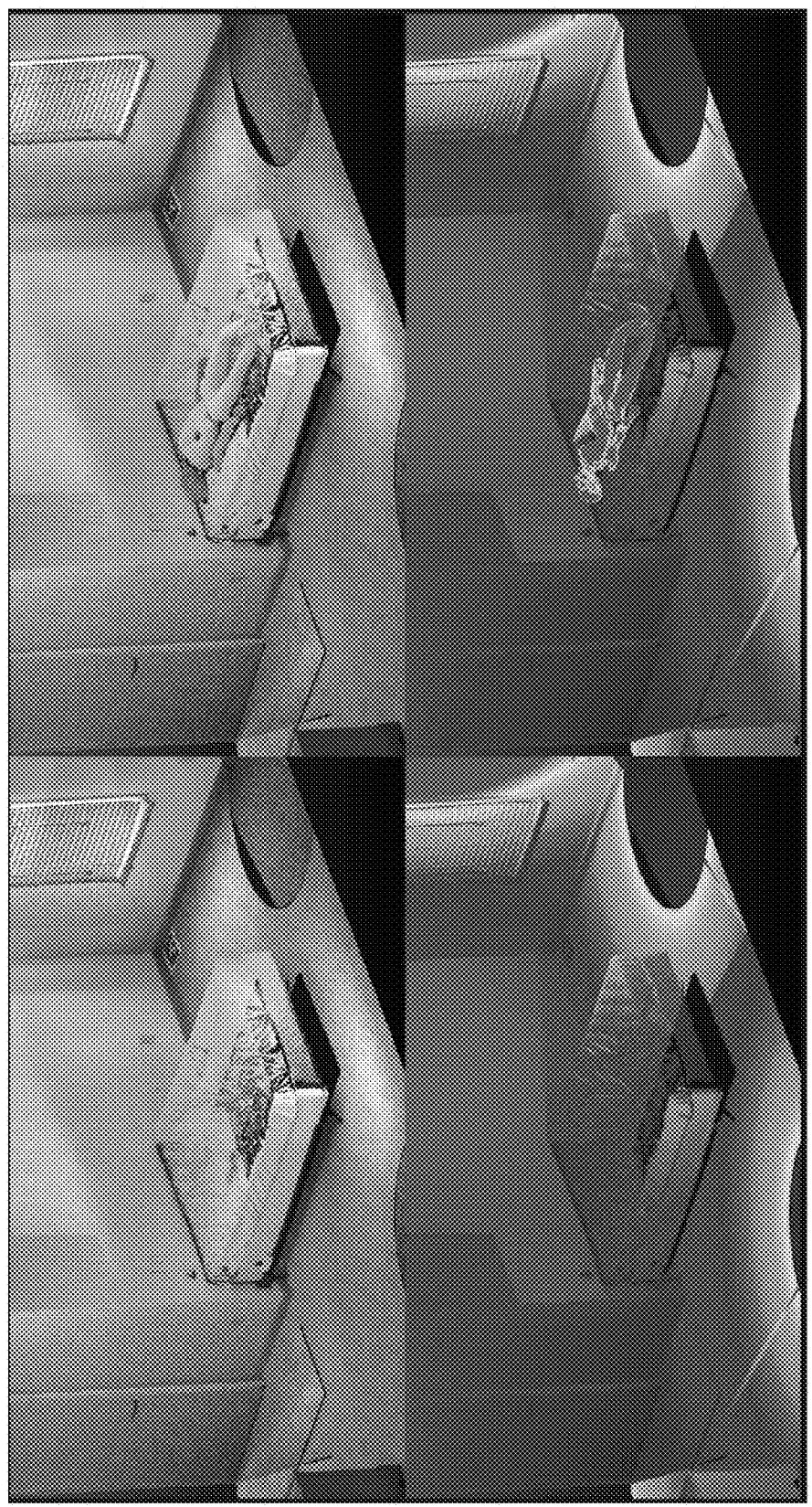
FIG. 21 shows an example of an original point cloud of a scene and a manipulated version of the scene in rendered in color, and renderings from the point cloud file mapped to a false color spectrum based on the density of points in the scene in accordance with some aspects of the disclosed subject matter.
Figure 22:
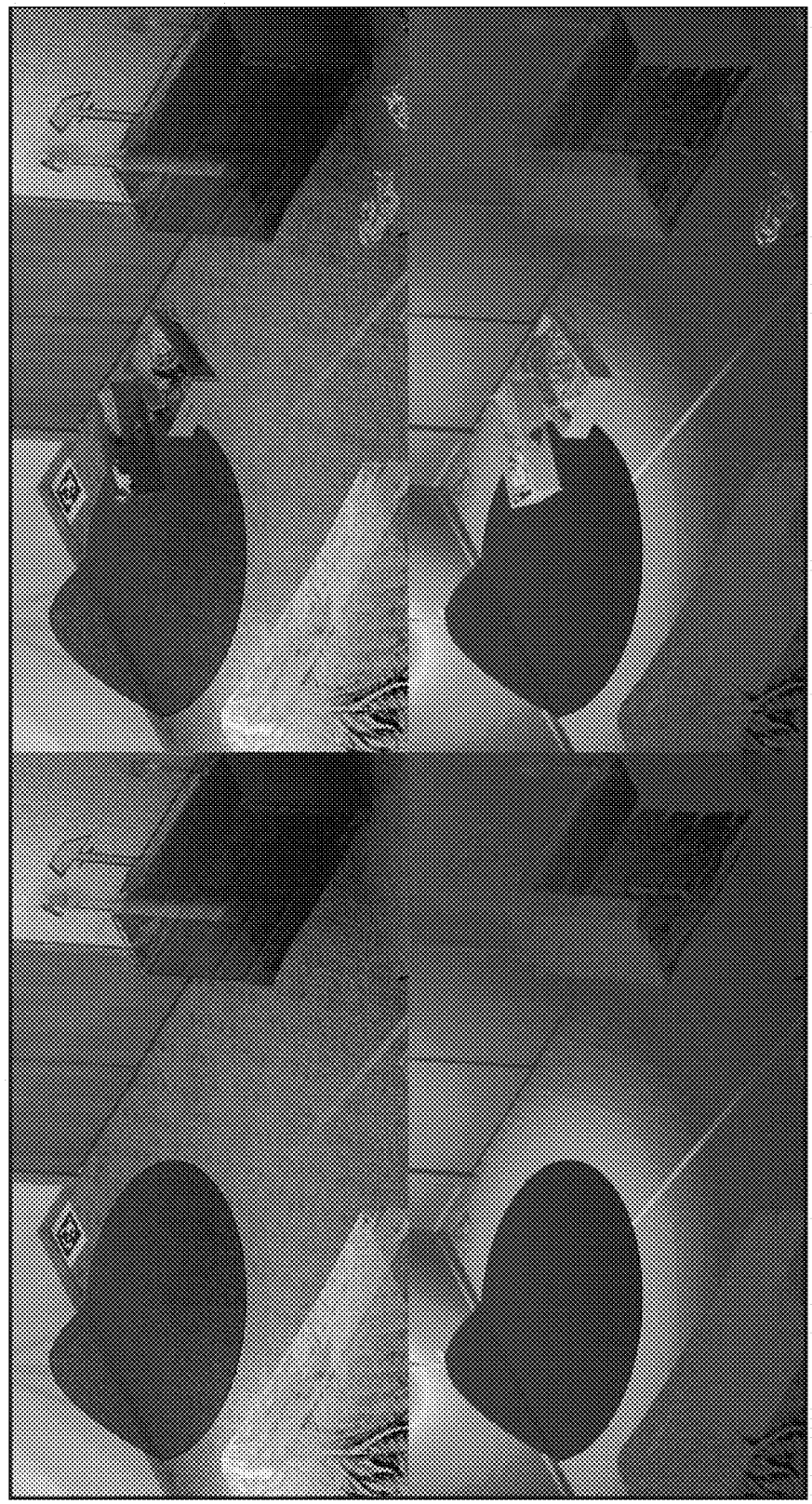
FIG. 22 shows another example of an original point cloud of a scene and a manipulated version of the scene in rendered in color, and renderings from the point cloud file mapped to a false color spectrum based on the density of points in the scene in accordance with some aspects of the disclosed subject matter.

As another example, process 1500 can determine the likely location of one or more scanners based on discontinuities in the density of the point cloud represented by the vector information and/or Euclidean distance information. In such an example, areas of low density can be due to a blind spot that many scanners have in which data is not captured (e.g., a portion of a surface immediately surrounding where the scanner is placed to perform a scan). When multiple scans are combined to create a model of a scene the blind spot of the scanner is likely to be a lower density region, and there is likely to be a discontinuity in density. An example of a blind spot being apparent in a rendering of a scene based on density is shown in FIGS. 21 and 22. Accordingly, in some aspects, process 1500 can analyze the density to find areas bounded by a density discontinuity having a circular edge. Such areas can represent a surface on which a scanner was placed while capturing data. Additionally, surfaces that are vertical near an area where a scanner was placed can be rendered as a relatively smooth high density region. Accordingly, such high density regions can be expected, and can be used to determine a likely location of the scanner.

Note that while process 1500 is depicted as a serial process through which each point is considered in succession, this is merely an example, and multiple points can be considered in parallel. Additionally, in some aspects, vector information associated with the points can be presented (e.g., via display 216) as the distances are calculated points are plotted, rather than presenting only after all points have been considered.

Figure 16:
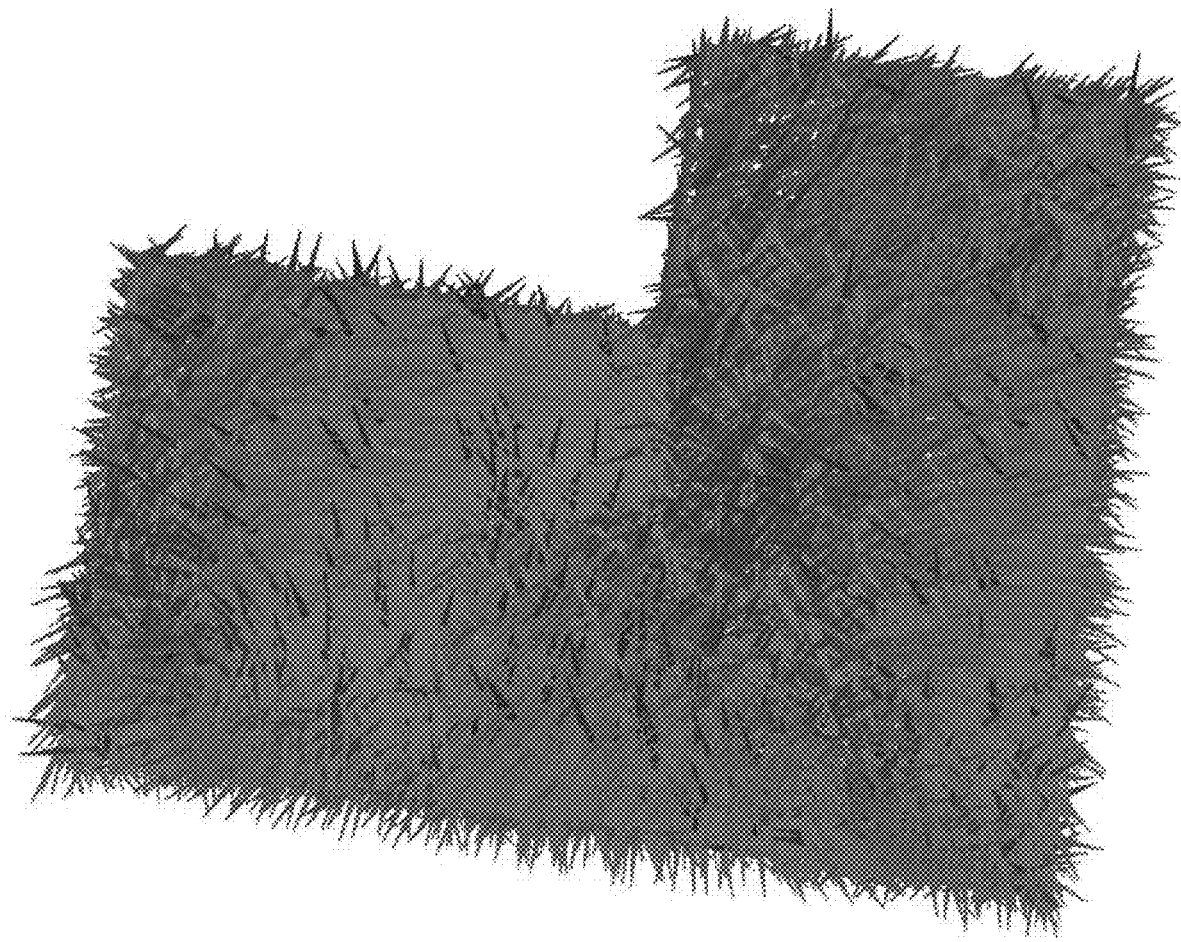
FIG. 16 shows an example rendering vector fields based on gradients in the density of points in a point cloud representation of a scene in accordance with some aspects of the disclosed subject matter.

FIG. 16 shows an example rendering vector fields based on gradients in the density of points in a point cloud representation of a scene in accordance with some aspects of the disclosed subject matter. As shown in FIG. 16, there are multiple regions with circular patterns apparent in the rendered vector field (i.e., in the bottom left and bottom right), while there is an interference pattern that is apparent between those two scan locations (e.g., as described above in connection with FIGS. 1A and 1B).

Figure 17:
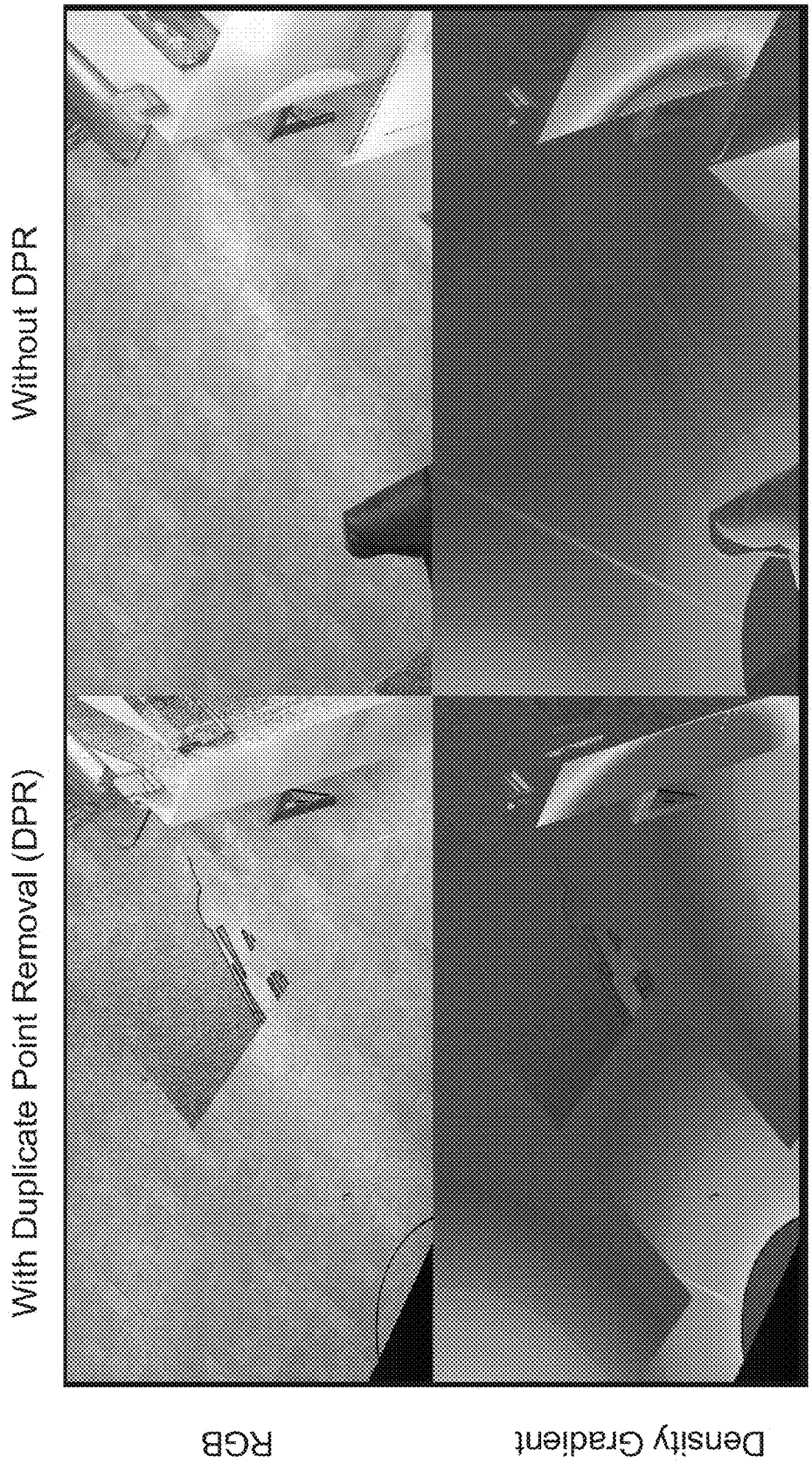
FIG. 17 shows an example of benign manipulations that can occur due to artifacts introduced when a point cloud of a scene is generated from multiple scans.

FIG. 17 shows an example of benign manipulations that can occur due to artifacts introduced when a point cloud of a scene is generated from multiple scans. Analyzing the density gradient of a scene has limitations for detecting manipulations. For example, during the process of combining multiple scans together to create a model, the density gradients become more complex to decipher. As opposed to having a single high density region collated with a single scan location, high density regions exist for each scan in the scene. The gradients from multiple locations combine together creating density interference patterns. While these gradients do not follow the simple relationships between density and distance, the gradients can generally be expected to show low frequency variations and high frequency regions may be treated as being suspicious. However, rapid changes in the gradient may also be part of a benign manipulation created through the processing pipeline used to create the composite of the scene. One example of this is a technique sometimes referred to as duplicate point removal (DPR). Another example, analysis of density gradients may become impossible if the original positions of points in a scan are purposely manipulated, such as by using downsampling techniques to reduce the amount of data used to store a scan.

An example of a "false positive" that can be generated by benign processing techniques is an optional internal optimization in the FARO SCENE software that is referred to as DPR. This optimization attempts to mitigate issues that occur in overlapping regions when multiple scans are combined together. Colors detected between scan locations are likely to not be identical (e.g., due to differences in distance, lighting, angle, etc.), and a shimmering effect can occur when trying to visualize these overlapping points. Additionally, these overlapping regions contain a higher density of points per unit volume, but this extra information may not be useful. When enabled, DPR divides space into octant regions and for regions that contain overlapping scans, retains only points from the "best" scan. An example of this is shown in FIG. 17, with the scene on the left being generate with DPR enabled. As shown, this can result in points over a given area that maintain a consistent color whose densities are inline with a single scan, but can result in abrupt changes in density gradient where the source scan changes. Such artifacts can be mitigate by determining whether the checking discontinuities exist on octant boundaries, and manipulations can still become apparent as an additional anomaly where one would otherwise be unexpected (e.g., as shown in FIG. 12, in which a more complex shape appears to be anomalous and diverges from the artifacts introduced by DPR).

Figure 18:
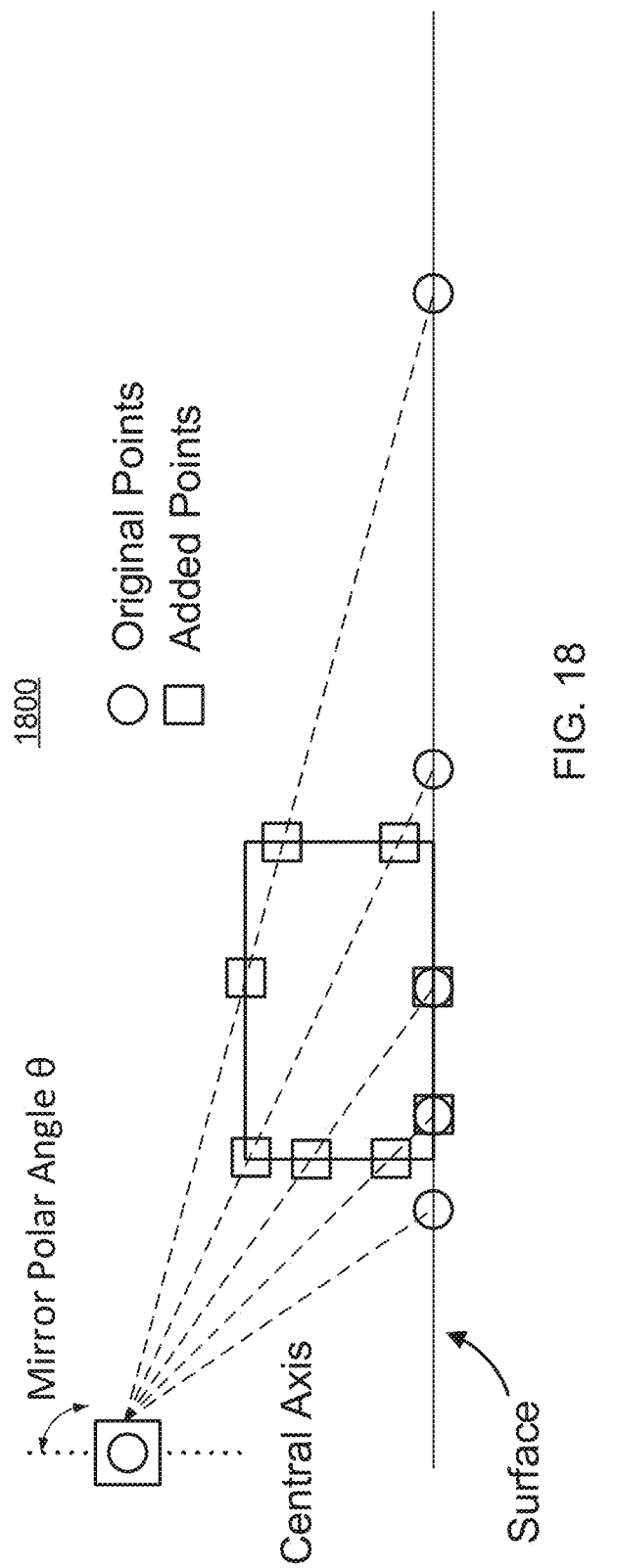
FIG. 18 shows an example of a cross-sectional view of point cloud points captured by a LiDAR scanner and points inserted into a scene as part of an object.

FIG. 18 shows an example of a cross-sectional view of point cloud points captured by a LiDAR scanner and points inserted into a scene as part of an object. While density gradient-based techniques analyze densities in Cartesian space, the process of LiDAR scanning works essentially in a spherical space relative to the scanner location. This makes it possible to convert between a point cloud of a single scan and images representing color and depth bidirectionally. As shown in FIG. 18, multiple samples should not exist on a given sample ray if only a single scan location were used because the points farther along the ray should be occluded by the point closer to the scanner.

Figure 19:
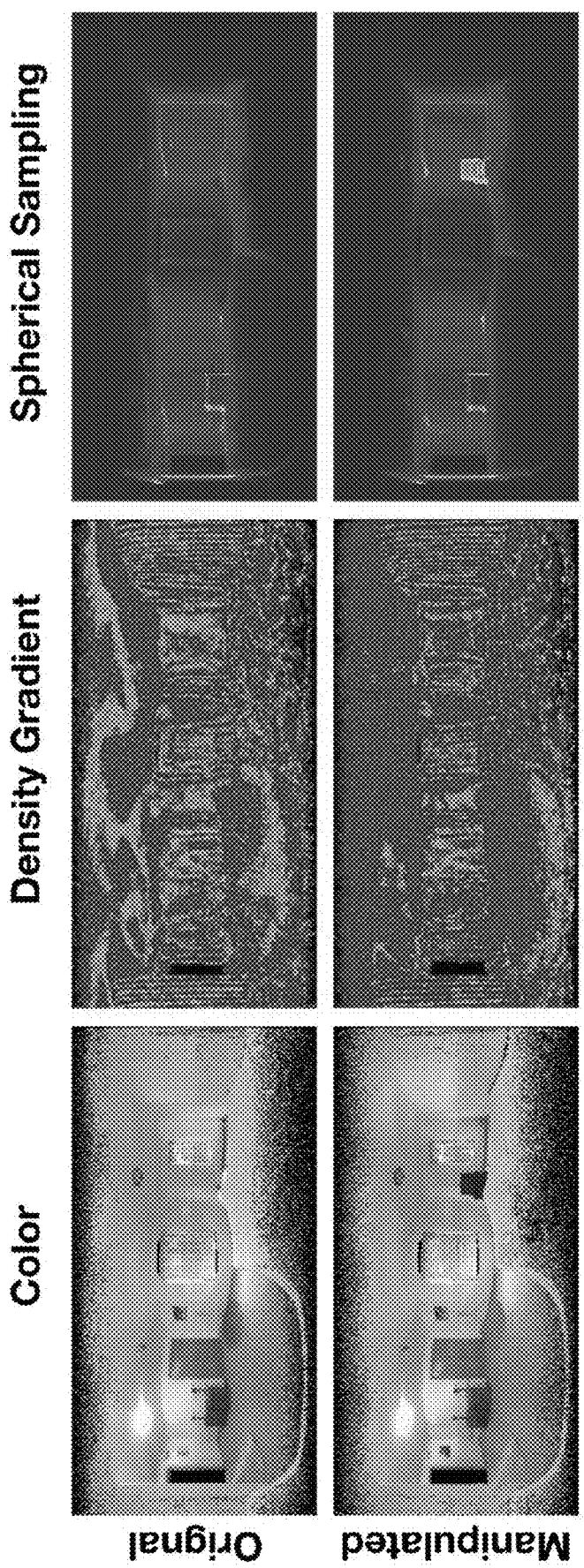
FIG. 19 shows an example of representations of a down-samples point cloud before and after a manipulation, respective density gradients of the original scene and the manipulated scene, and a representation based on a spherical sampling and analysis technique in accordance with some embodiments of the disclosed subject matter.

However, as multiple scans are combined together, these constraints become less defined as multiple samples can occur, especially along surface edges that are parallel to the scan ray. However, the way in which densities are manifested along a given scan ray should still be explainable. These characteristics can be especially useful when a scan has been down-sampled. As described above, point clouds generally include a very large amount of data (e.g., in comparison to 2D images or computer generated 3D images). In an attempt to reduce the complexity of a point cloud, some programs and processes utilize down-sampling techniques by forcing points onto a grid and only storing one point per grid cell. For the example, the scene shown in FIG. 19 represents a point cloud that was down-sampled to a minimum of 5 millimeter (mm) spacing between points in each dimension (note that empty space or "air" can still result in gaps larger than 5 mm), resulting in a data reduction from a 4 GB file to a file size of 57 MB. As shown in FIG. 19, while this process removes the fine details of the scene, the gross details still remain in the colored point cloud. Unfortunately, this process can fundamentally alter the density gradient, resulting in manipulation detection techniques based on point density being less useful because the fine details of point positions no longer exist.

FIG. 19 shows an example of representations of a down-samples point cloud before and after a manipulation, respective density gradients of the original scene and the manipulated scene, and a representation based on a spherical sampling and analysis technique in accordance with some embodiments of the disclosed subject matter. The images shown in FIG. 19 were generated by positioning the scene so that the origin was at the center of the scene's bounds, and then converting into spherical coordinates. The scene was then sampled using a ray projected from the origin toward evenly spaced points in the scene, with samples being taken at 32,768 discrete directions defined by 256 evenly spaced values in the theta ($\theta$) direction and 128 evenly spaced values in the phi ($\phi$) direction to generate 2D representations of the scene. Each ray can intercept however many points lie on the ray in the radial direction). The color scene shown in FIG. 19 was generated by storing the color value from the closet point to the origin that was interpreted by a ray at a particular combination of theta and phi (e.g., a ray projected at a particular ($\theta$, $\phi$) coordinate), while a second "image" was generated by storing a count of the number of points intercepted by the ray. Note that the ray used to generate FIG. 19 were projected as frustums with a thickness that increases with distance from the origin. For example, the frustum that is projected can be increased in thickness such that the frustums cover the entire scene. As shown in FIG. 19, the manipulation is no longer detectable using density gradient-based techniques, because all points have been positioned in a regular distribution. Spherical sampling techniques can provide a valuable perspective, clearly showing that an object (in this example, a chair) has been added to the scene.

Figure 20:
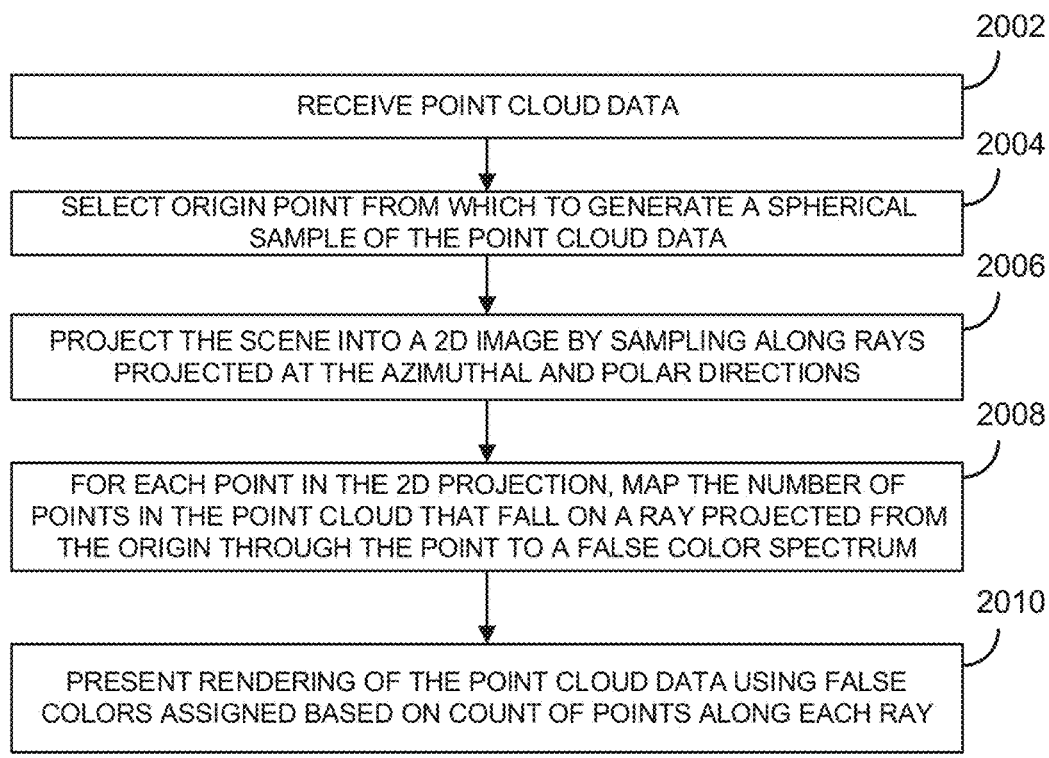
FIG. 20 shows an example of a still another process for detecting manipulations of point cloud data in accordance with some aspects of the disclosed subject matter.

Note that techniques described in connection with FIGS. 18-20 are can be limited in some cases. For example, the density at which the spherical space is sampled can have a large effect on the resultant point counts. If the sampling density is set too high or too low, the technique may not work correctly. In general, for an unaltered scene, the sampling value should match the original sampling density of the scanner. For example, in a scene that has not been down-sampled, the sampling value can match the average sampling density at which the portion of the scene being analyzed was scanned. As another example, in a scene that has been down-sampled, the sampling value can match the density produced by the down-sampling procedure. Additionally, while these techniques are clearly defined for a scene with a single scan location, this is likely not the case for a tested 3D environment. For example, the scene shown in FIG. 19 was created using two different scan locations and the origin for the spherical coordinates was placed in the center of the bounds. While this technique worked well in this case, as more scans are added, this method may need to be adapted. For example, the number of samples taken in the radial direction can be limited to points that are in close proximity to the closest point along a sample ray (e.g., within a threshold distance beyond the closest point). This can mitigate the possibility of oversampling unseen points from other scan locations (e.g. points from an entirely different room or area), thereby providing a means to detect object-sized manipulations. As another example, the number of samples taken in the radial direction can be limited to a threshold distance from the origin to mitigate the possibility of oversampling unseen points from other scan locations. In a more particular example, the radial threshold can be based on the size of a room being analyzed.

FIG. 20 shows an example of a still another process for detecting manipulations of point cloud data in accordance with some aspects of the disclosed subject matter. In some aspects, process 2000 can begin by receiving point cloud data at 2002 from any suitable source (e.g., as described above in connection with 1302 of FIG. 13). In some aspects, the point cloud data can be formatted using Cartesian coordinates to describe the spatial locations of points.

At 2004, process 2000 can select an origin point from which to generate a spherical sample of the point cloud data. In some aspects, process 2000 can select any suitable point as an origin. For example, process 2000 can select a center point of a volume to be analyzed, such as a center point of a scanned volume, or a center point of a room to be analyzed.

At 2006, process 2000 can project the scene into a 2D image by sampling along rays projected from the origin into a spherical coordinate space. For example, process 2000 can project a ray from the origin toward various directions defined by combinations of angular coordinates (e.g., various pairs of theta and phi (θ, φ)). In such an example, the azimuthal and polar directions can be sampled to approximately match the original sampling rate of the LiDAR and/or a down-sampled rate (e.g., a 5 mm grid).

In some aspects, at each pair of azimuth and polar coordinates to be sampled, process 2000 can project a ray having a diameter in the azimuth-polar plane that is approximately equal to the distance between samples (e.g., such that points are relatively unlikely to be samples by two rays), and recording the number of points that intersect each ray. In some aspects, the color (e.g., as values of red, green, and blue) of a point nearest to the origin that the ray intersects can be recorded to generate a color image of the scene.

In some aspects, the projected rays can have a thickness that extends along the azimuthal and/or polar plane(s). For example, process 2000 can project the rays as frustums having a square cross-section that extends perpendicular to the radial direction of the ray. In some such aspects, the rays can collectively contiguously cover the entire portion of the scene being projected.

In some aspects, process 2000 can constrain the length of the ray in the radial direction to avoid counting points that are not associated with the volume being analyzed. For example, process 2000 can limit the distance that the ray is projected past the first point that is intersected to mitigate the chances that points from a neighboring space (e.g., another room in a house that was scanned) are counted for a particular ray. In a more particular example, process 2000 can constrain the length of the ray to extend up to 0.5 to 1.5 meters (e.g., 0.5 meters, 0.6 meters, 0.7 meters, 0.8 meters, 0.9 meters, 1.0 meters, 1.1 meters, 1.2 meters, 1.3 meters, 1.4 meters, or 1.5 meters) from the first point that is encountered. As another more particular example, process 2000 can constrain the length based on a distribution of the distances to the first points encountered by each ray, which can depend on the shape of the distribution. In such an example, the constraint can be a distance that is one standard deviation from the mean first distance. As another example, in some embodiments, process 2000 can limit the distance the ray is projected from the origin to a maximum distance based on the dimensions of the volume being analyzed. In a particular example, if a 3×3×2.5 m room is being analyzed, process 2000 can limit the maximum distance of the ray to 1.9 m (i.e., ~half the length of the diagonal of the room).

At 2008, process 2000 can map each ray to a false color spectrum based on the number of points that the ray intersected. For example, a jet color map can be applied to the count for each ray. In such an example, the average number of points can be assigned a first color, and rays associated more points can be assigned colors along one direction of a spectrum based on a deviation from the average, while rays associated with fewer point can be assigned colors along the other direction of the spectrum based on a deviation from the average.

At 2010, process 2000 can present a rendering of the point cloud data using false colors assigned based on the number of points associated with each ray. FIG. 19 shows examples of point cloud renderings based that can be generated using process 2000.

FIG. 21 shows an example of an original point cloud of a scene and a manipulated version of the scene in rendered in color, and renderings from the point cloud file mapped to a false color spectrum based on the density of points in the scene in accordance with some aspects of the disclosed subject matter. As shown in FIG. 21, a mannequin that was added to the scene stands out when the scene is rendered based on density gradients, as it has a much higher point density than other neighboring objects. The density gradient rendering shown in FIG. 21 was based on a density search radius of 1 cm, with denser regions being presented as red and less dense regions being presented as blue.

FIG. 22 shows another example of an original point cloud of a scene and a manipulated version of the scene in rendered in color, and renderings from the point cloud file mapped to a false color spectrum based on the density of points in the scene in accordance with some aspects of the disclosed subject matter. As shown in FIG. 22, two drawers that were added to the scene are apparent in the color images due to their intersection with a blind spot of an imager, and are also apparent in the density gradient-based rendering doe to the deviation from the otherwise relatively smooth density gradient.

Figure 23:
FIG. 23 shows yet another example of an original point cloud of a scene and a manipulated version of the scene in rendered in color, and renderings from the point cloud file mapped to a false color spectrum based on the density of points in the scene in accordance with some aspects of the disclosed subject matter.

FIG. 23 shows yet another example of an original point cloud of a scene and a manipulated version of the scene in rendered in color, and renderings from the point cloud file mapped to a false color spectrum based on the density of points in the scene in accordance with some aspects of the disclosed subject matter. As shown in FIG. 23, the artwork added to the wall in the manipulated image is not readily apparent as a manipulation in the color image, but stands out starkly in the density-gradient-based image.

Note that, although the examples described herein are generally described in connection with single 2D renderings, this is merely an example, and in some aspects, two images can be rendered in parallel from two different viewpoints to facilitate presentation of a stereoscopic pair of images. For example, a GPU associated with a head mounted display can render two images in parallel using techniques described herein.

In some aspects, any suitable computer readable media can be used for storing instructions for performing the functions and/or processes described herein. For example, in some aspects, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the processes of FIGS. 13-15 can be executed or performed in any order or sequence not limited to the order and sequence shown and described in the figures. Also, some of the above steps of the processes of FIGS. 13-15 can be executed or performed substantially simultaneously where appropriate or in parallel to reduce latency and processing times.

Although the invention has been described and illustrated in the foregoing illustrative aspects, it is understood that the present disclosure has been made only by way of example, and that numerous changes in the details of implementation of the invention can be made without departing from the spirit and scope of the invention, which is limited only by the claims that follow. Features of the disclosed aspects can be combined and rearranged in various ways.

What is claimed is:

1. A method for presenting information indicative of whether a manipulation of point cloud data has occurred, comprising:
   receiving point cloud data comprising a plurality of points that were captured using a LiDAR scanner, wherein each point of the plurality of points is associated with a three dimensional position within a scene represented by the point cloud, color information, and an index value that uniquely identifies the point;
   determining, for each of the plurality of points in an order based on the associated index value, a value indicative of a density of point cloud points in a region surrounding the respective point based on a distance from the respective point to a closest point in the point cloud, wherein the closest point in the point cloud is associated with a shortest Euclidean distance to the respective point;
   associating, for each of the plurality of points, the value indicative of density with the respective point; and
   causing a representation of at least a portion of the point cloud data to be presented based on the position information associated with each point of the plurality of points, and the value indicative of density associated with each of the plurality of points.

2. The method of claim 1, wherein determining the value indicative of a density of points in a region surrounding the respective point comprises:
   identifying a closest point in the point cloud data to the respective point; and
   generating a vector indicative of the distance and direction between the respective point and the closest point in the point cloud data.

3. The method of claim 2, wherein identifying a closest point in the point cloud data to the respective point comprises:
   (a) drawing a sphere having a predetermined radius around the respective point;
   (b) determining that the number of points in the point cloud data that fall within the sphere is greater than 1;
   (c) in response to determining that the number of points in the point cloud data that fall within the sphere is greater than 1, redrawing the sphere with a smaller radius;
   (d) repeating b) and c) until the number of points within the sphere is equal to 1; and
   (e) identifying the point remaining within the sphere as the closest point in the point cloud data to the respective point.

4. The method of claim 1, wherein determining a value indicative of a density of points in a region surrounding the respective point comprises:
   drawing a sphere having a predetermined radius around the respective point; and
   recording the number of points of the point cloud data that fall within the sphere as the value indicative of density.

5. The method of claim 4, wherein the predetermined radius is one centimeter.

6. The method of claim 1, wherein presenting a representation of at least the portion of the point cloud data based on the location information associated with each point of the plurality of points, and the value indicative of density associated with each of the plurality of points comprises:
   causing an image comprising a plurality of pixels to be presented, each of the plurality of pixels corresponding to at least one of the plurality of points, wherein each of the plurality of pixels is presented in a false color based on the value indicative of density associated with the respective point of the plurality of points.

7. The method of claim 6, wherein the false color falls on a spectrum from blue to red with less dense points being represented toward the blue end of the spectrum and more dense points being represented toward the red end of the spectrum.

8. The method of claim 6, wherein the false color in which each of the plurality of pixels is presented is based on an average of the value indicative of density associated with points in the point cloud data that coincide with the region of the point cloud data represented by the respective pixel.

9. A system for presenting information indicative of whether a manipulation of point cloud data has occurred, the system comprising:
   at least one hardware processor that is programmed to:
      receive point cloud data comprising a plurality of points that were captured using a LiDAR scanner, wherein each point of the plurality of points is associated with a three dimensional position within a scene represented by the point cloud, color information, and an index value that uniquely identifies the point;
      determine, for each of the plurality of points in an order based on the associated index value, a value indicative of a density of point cloud points in a region surrounding the respective point based on a distance from the respective point to a closest point in the point cloud, wherein the closest point in the point cloud is associated with a shortest Euclidean distance to the respective point;
      associate, for each of the plurality of points, the value indicative of density with the respective point; and
      cause a representation of at least a portion of the point cloud data to be presented based on the position information associated with each point of the plurality of points, and the value indicative of density associated with each of the plurality of points.

10. The system of claim 9, wherein the at least one hardware processor is further programmed to:
    identify a closest point in the point cloud data to the respective point; and
    generate a vector indicative of the distance and direction between the respective point and the closest point in the point cloud data.

11. The system of claim 10, wherein the at least one hardware processor is further programmed to:
    (a) draw a sphere having a predetermined radius around the respective point;
    (b) determine that the number of points in the point cloud data that fall within the sphere is greater than 1;
    (c) in response to determining that the number of points in the point cloud data that fall within the sphere is greater than 1, redraw the sphere with a smaller radius;
    (d) repeat b) and c) until the number of points within the sphere is equal to 1; and
    (e) identify the point remaining within the sphere as the closest point in the point cloud data to the respective point.

12. The system of claim 9, wherein the at least one hardware processor is further programmed to:
    draw a sphere having a predetermined radius around the respective point; and record the number of points of the point cloud data that fall within the sphere as the value indicative of density.

13. The system of claim 12, wherein the predetermined radius is one centimeter.

14. The system of claim 9, wherein the at least one hardware processor is further programmed to:
cause an image comprising a plurality of pixels to be presented, each of the plurality of pixels corresponding to at least one of the plurality of points, wherein each of the plurality of pixels is presented in a false color based on the value indicative of density associated with the respective point of the plurality of points.

15. The system of claim 14, wherein the false color falls on a spectrum from blue to red with less dense points being represented toward the blue end of the spectrum and more dense points being represented toward the red end of the spectrum.

16. The system of claim 14, wherein the false color in which each of the plurality of pixels is presented is based on an average of the value indicative of density associated with points in the point cloud data that coincide with the region of the point cloud data represented by the respective pixel.

17. A non-transitory computer readable medium containing computer executable instructions that, when executed by a processor, cause the processor to perform a method for presenting information indicative of whether a manipulation of point cloud data has occurred, comprising:
receiving point cloud data comprising a plurality of points that were captured using a LiDAR scanner, wherein each point of the plurality of points is associated with a three dimensional position within a scene represented by the point cloud, color information, and an index value that uniquely identifies the point;
determining, for each of the plurality of points in an order based on the associated index value, a value indicative of a density of point cloud points in a region surrounding the respective point based on a distance from the respective point to a closest point in the point cloud, wherein the closest point in the point cloud is associated with a shortest Euclidean distance to the respective point;
associating, for each of the plurality of points, the value indicative of density with the respective point; and
causing a representation of at least a portion of the point cloud data to be presented based on the position information associated with each point of the plurality of points, and the value indicative of density associated with each of the plurality of points.

18. The non-transitory computer-readable medium of claim 17, wherein determining the value indicative of a density of points in a region surrounding the respective point comprises:
identifying a closest point in the point cloud data to the respective point; and
generating a vector indicative of the distance and direction between the respective point and the closest point in the point cloud data.

19. The non-transitory computer-readable medium of claim 18, wherein identifying a closest point in the point cloud data to the respective point comprises:
(a) drawing a sphere having a predetermined radius around the respective point;
(b) determining that the number of points in the point cloud data that fall within the sphere is greater than 1;
(c) in response to determining that the number of points in the point cloud data that fall within the sphere is greater than 1, redrawing the sphere with a smaller radius;
(d) repeating b) and c) until the number of points within the sphere is equal to 1; and
(e) identifying the point remaining within the sphere as the closest point in the point cloud data to the respective point.

20. The non-transitory computer-readable medium of claim 17, wherein determining a value indicative of a density of points in a region surrounding the respective point comprises:
drawing a sphere having a predetermined radius around the respective point; and
recording the number of points of the point cloud data that fall within the sphere as the value indicative of density.

21. The non-transitory computer-readable medium of claim 17, wherein presenting a representation of at least the portion of the point cloud data based on the location information associated with each point of the plurality of points, and the value indicative of density associated with each of the plurality of points comprises:
causing an image comprising a plurality of pixels to be presented, each of the plurality of pixels corresponding to at least one of the plurality of points, wherein each of the plurality of pixels is presented in a false color based on the value indicative of density associated with the respective point of the plurality of points.

* * * * *